US010306660B2

(12) United States Patent
Gupta et al.

(10) Patent No.: US 10,306,660 B2
(45) Date of Patent: May 28, 2019

(54) MECHANISMS FOR CO-EXISTENCE BETWEEN COMMUNICATION MODES IN A MESH WIDE AREA NETWORK

(71) Applicant: QUALCOMM Incorporated, San Diego, CA (US)

(72) Inventors: Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 15/273,387

(22) Filed: Sep. 22, 2016

(65) Prior Publication Data

US 2017/0280472 A1    Sep. 28, 2017

Related U.S. Application Data

(60) Provisional application No. 62/312,984, filed on Mar. 24, 2016.

(51) Int. Cl.
| | |
|---|---|
| *H04W 72/12* | (2009.01) |
| *H04L 5/00* | (2006.01) |
| *H04W 72/04* | (2009.01) |
| *H04W 88/06* | (2009.01) |
| *H04L 12/64* | (2006.01) |

(Continued)

(52) U.S. Cl.
CPC ....... *H04W 72/1205* (2013.01); *H04L 5/0007* (2013.01); *H04W 72/048* (2013.01); *H04W 72/1215* (2013.01); *H04L 12/6418* (2013.01); *H04W 88/02* (2013.01); *H04W 88/06* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 9,185,697 B2 * | 11/2015 | Kuchibhotla | H04W 76/023 |
| 9,622,064 B2 * | 4/2017 | Zhu | H04W 8/005 |
| 9,706,385 B1 * | 7/2017 | Sevindik | H04W 8/005 |

(Continued)

OTHER PUBLICATIONS

Alcatel-Lucent et al., "Node B TTI Indication for 2/10 ms TTI Concurrent Operations in Cell FACH," 3GPP TSG-RAN WG1 Meeting #67, R1-114344, San Francisco, USA, Nov. 14-18, 2011, 4 pgs., XP050562425, 3rd Generation Partnership Project.

(Continued)

*Primary Examiner* — Hong S Cho
(74) *Attorney, Agent, or Firm* — Holland & Hart LLP

(57) ABSTRACT

Wireless devices in a wireless network may use multiple communication modes to perform device-to-device (D2D) communication in a mesh wide area network (WAN). For instance, one communication mode may be contention-based, while the other communication mode may be scheduled (e.g., by a relay). To facilitate co-existence between these communication modes, a wireless device may identify a set of resources set aside for D2D communications and may select and reserve a transmission time interval (e.g., a slot) of the D2D resources. Other wireless devices may determine the transmission time interval is reserved and refrain from transmitting during that transmission time interval. In another example, a base station may assign a D2D communication mode to certain sets of D2D resources.

30 Claims, 17 Drawing Sheets

(51) Int. Cl.
  *H04W 88/02* (2009.01)
  *H04W 88/08* (2009.01)

(56) References Cited

U.S. PATENT DOCUMENTS

| | | |
|---|---|---|
| 2012/0250636 A1 | 10/2012 | Wang et al. |
| 2014/0185529 A1* | 7/2014 | Lim .................... H04W 76/023 370/328 |
| 2014/0269555 A1* | 9/2014 | Sadasivam ........ H04W 72/0406 370/329 |
| 2015/0016358 A1 | 1/2015 | Yie et al. |
| 2015/0098422 A1* | 4/2015 | Sartori .................. H04W 8/005 370/329 |
| 2016/0037551 A1 | 2/2016 | Lei et al. |
| 2016/0119931 A1 | 4/2016 | Soriaga et al. |
| 2016/0183237 A1 | 6/2016 | Cai et al. |
| 2017/0208616 A1* | 7/2017 | Panteleev ......... H04W 72/1263 |
| 2017/0257865 A1* | 9/2017 | Halabian ........... H04W 72/0453 |

OTHER PUBLICATIONS

ISA/EP, International Search Report and Written Opinion of the International Searching Authority, Int'l Application No. PCT/US2017/022867, dated Jun. 20, 2017. European Patent Office, Rijswijk, NL, 14 pgs.

Qualcomm Incorporated, "Coexistence of D2D Discovery and WAN," 3GPP TSG-RAN WG1 Meeting #76bis, R1-141456, Shenzhen, China, Mar. 31-Apr. 4, 2014, 6 pgs., XP050787125, 3rd Generation Partnership Project.

Samsung, "Mode 2 Resource Allocation for D2D Broadcast Communication," 3GPP TSG RAN WG1 Meeting #78, R1-143084, Dresden, Germany, Aug. 18-22, 2014, 4 pgs., XP050788563, 3rd Generation Partnership Project.

IPEA/EP, Second Written Opinion of the International Preliminary Examining Authority, Int'l Application No. PCT/US2017/022867, dated Mar. 9, 2018, European Patent Office, Rijswijk, NL, 7 pgs.

* cited by examiner

MECHANISMS FOR CO-EXISTENCE BETWEEN COMMUNICATION MODES IN A MESH WIDE AREA NETWORK

CROSS REFERENCES

The present Application for Patent claims priority to U.S. Provisional Patent Application No. 62/312,984 by Gupta, et al., entitled "Mechanisms For Co-Existence Between Communication Modes In A Mesh Wide Area Network For Internet of Things," filed Mar. 24, 2016, assigned to the assignee hereof.

INTRODUCTION

The following relates generally to wireless communication, and more specifically to mechanisms for co-existence between communication modes in a mesh network, such as a mesh wide area network (WAN) that supports the internet of things (IoT).

Wireless communications systems are widely deployed to provide various types of communication content such as voice, video, packet data, messaging, broadcast, and so on. These systems may be capable of supporting communication with multiple users by sharing the available system resources (e.g., time intervals, radio frequency spectrum bands, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Various kinds of networks may be used to support communication needs of a UE. For instance, a WAN may be used to provide wireless communication coverage over large geographical distances (e.g., across cities, towns, etc.). While a wireless local area network (WLAN) may be used to provide wireless communication coverage over smaller distances (e.g., within a home or business). In some examples, an LTE network may be used to implement a wireless WAN and may use a central scheduling entity to schedule associated UEs for communication over a wireless medium. UEs in a WLAN network may not be centrally scheduled, but may communicate with a central entity (e.g., an access point) using contention-based access protocols to take control of a wireless medium. In yet other examples, UEs may bypass a central entity and may communicate directly with one another, which may be referred to as device-to-device (D2D) communications.

A mesh WAN may utilize a combination of central scheduling, distributed scheduling (e.g., using relays), and D2D communications to expand wireless communication coverage to reach UEs in areas associated with poor channel conditions (e.g., a metering device in a basement). In some cases, the co-existence of different types of scheduling mechanisms and communication modes in a mesh WAN may result in increased interference between UEs in the mesh WAN.

SUMMARY

A method of wireless communication is described. The method may include receiving, from a base station of a wireless network, a schedule for communications over a shared radio frequency spectrum band, the schedule identifying a first set of communication resources allocated to direct communications and a second set of communication resources allocated to D2D communications; identifying one or more transmission time intervals (TTIs) of the second set of communication resources; selecting a TTI from the one or more TTIs; and transmitting an indication that the selected TTI is reserved by the wireless device.

An apparatus for wireless communication is described. The apparatus may include means for receiving, from a base station of a wireless network, a schedule for communications over a shared radio frequency spectrum band, the schedule identifying a first set of communication resources allocated to direct communications and a second set of communication resources allocated to D2D communications; means for identifying one or more TTIs of the second set of communication resources; means for selecting a TTI from the one or more TTIs; and means for transmitting an indication that the selected TTI is reserved by the wireless device.

Another apparatus is described. The apparatus may include a processor and memory in electronic communication with the processor. The processor and memory may be configured to receive, from a base station of a wireless network, a schedule for communications over a shared radio frequency spectrum band, the schedule identifying a first set of communication resources allocated to direct communications and a second set of communication resources allocated to D2D communications; identify one or more TTIs of the second set of communication resources; select a TTI from the one or more TTIs; and transmit an indication that the selected TTI is reserved by the wireless device.

A non-transitory computer readable medium for wireless communication is described. The non-transitory computer-readable medium may include instructions executable by processor to receive, from a base station of a wireless network, a schedule for communications over a shared radio frequency spectrum band, the schedule identifying a first set of communication resources allocated to direct communications and a second set of communication resources allocated to D2D communications; identify one or more TTIs of the second set of communication resources; select a TTI from the one or more TTIs; and transmit an indication that the selected TTI is reserved by the wireless device.

In some examples of the method, apparatuses, or non-transitory computer readable medium, the wireless devices in the wireless network may perform the D2D communications using one of a first mode or a second mode.

In some examples of the method, apparatuses, or non-transitory computer-readable medium, the indication may include a TTI index, periodicity information, offset information, or a combination thereof.

Some examples of the method, apparatuses, or non-transitory computer-readable medium may include operations, features, means, or instructions for transmitting a transmission in a first discovery interval, the transmission including an identifier of the wireless device, a wake-up schedule for the wireless device, transmission parameters, association parameters, a communication mode of the wireless device, or a combination thereof, and the indication may be transmitted in a second discovery interval.

In some examples of the method, apparatuses, or non-transitory computer-readable medium, the transmission may be transmitted in the first discovery interval based at least in part on a wake-up schedule, and the wake-up schedule may be used to schedule a common wake-up period for the wireless devices in the wireless network.

Some examples of the method, apparatuses, or non-transitory computer-readable medium may include operations, features, means, or instructions for identifying a communication resource within the first discovery interval for transmitting the transmission, and using a location of the communication resource in the second discovery interval for transmitting the indication.

In some examples of the method, apparatuses, or non-transitory computer-readable medium, the indication may be transmitted in a discovery interval, and the indication may include an identifier of the wireless device, a wake-up schedule for the wireless device, transmission parameters, association parameters, or a combination thereof.

In some examples of the method, apparatuses, or non-transitory computer-readable medium, the selecting may include operations, features, means, or instructions for identifying that the TTI is not reserved by another wireless device.

Some examples of the method, apparatuses, or non-transitory computer-readable medium may include operations, features, means, or instructions for receiving a transmission that includes another indication from another wireless device during a discovery interval, and receiving the transmission may be based at least in part on a wake-up schedule of the wireless device.

Some examples of the method, apparatuses, or non-transitory computer-readable medium may include operations, features, means, or instructions for receiving a transmission from another wireless device, and the transmission may include another indication that a different TTI is reserved by the other wireless device, and selecting the TTI based at least in part on the other indication.

Some examples of the method, apparatuses, or non-transitory computer-readable medium may include operations, features, means, or instructions for receiving a transmission from another wireless device, and the transmission may include another indication that the TTI is reserved by the other wireless device. Some examples of the method, apparatuses, or non-transitory computer-readable medium may include operations, features, means, or instructions for measuring a received signal strength of the transmission, and selecting the TTI based at least in part on the measured signal strength of the transmission.

In some examples of the method, apparatuses, or non-transitory computer-readable medium, the wireless devices of the wireless network may perform D2D communications according to a scheduled communication scheme or a contention-based communication scheme.

Some examples of the method, apparatuses, or non-transitory computer-readable medium may include operations, features, means, or instructions for receiving a configuration message configuring the wireless device to perform the D2D communications using the first mode.

A method of wireless communication is described. The method may include allocating a first set of communication resources for direct communications and a second set of communication resources for D2D communications to schedule communications over a wireless network, wherein wireless devices in the wireless network perform D2D communications using one of a first mode or a second mode; assigning the second set of communication resources to wireless devices using the first mode; and transmitting an indication that the second set of communication resources is reserved for the wireless devices using the first mode.

An apparatus for wireless communication is described. The apparatus may include means for allocating a first set of communication resources for direct communications and a second set of communication resources for D2D communications to schedule communications over a wireless network, wherein wireless devices in the wireless network perform D2D communications using one of a first mode or a second mode; means for assigning the second set of communication resources to wireless devices using the first mode; and means for transmitting an indication that the second set of communication resources is reserved for the wireless devices using the first mode.

Another apparatus is described. The apparatus may include a processor and memory in electronic communication with the processor. The processor and memory may be configured to allocate a first set of communication resources for direct communications and a second set of communication resources for D2D communications to schedule communications over a wireless network, wherein wireless devices in the wireless network perform D2D communications using one of a first mode or a second mode; assign the second set of communication resources to wireless devices using the first mode; and transmit an indication that the second set of communication resources is reserved for the wireless devices using the first mode.

A non-transitory computer readable medium for wireless communication is described. The non-transitory computer-readable medium may be executable by a processor to allocate a first set of communication resources for direct communications and a second set of communication resources for D2D communications to schedule communications over a wireless network, where wireless devices in the wireless network perform D2D communications using one of a first mode or a second mode; assign the second set of communication resources to wireless devices using the first mode; and transmit an indication that the second set of communication resources is reserved for the wireless devices using the first mode.

In some examples of the method, apparatuses, or non-transitory computer-readable medium, the first mode or the second mode may include a scheduled communication scheme or a contention-based communication scheme.

In some examples of the method, apparatuses, or non-transitory computer-readable medium, wireless devices may perform D2D communications using a scheduled communication scheme or a contention-based communication scheme.

Some examples of the method, apparatuses, or non-transitory computer-readable medium may include operations, features, means, or instructions for transmitting the schedule to the wireless devices in the wireless network.

Some examples of the method, apparatuses, or non-transitory computer-readable medium may include operations, features, means, or instructions for transmitting a configuration message configuring a wireless device to perform the D2D communications using the one of the scheduled communication scheme or the contention-based communication scheme.

DETAILED DESCRIPTION

Figure 1:
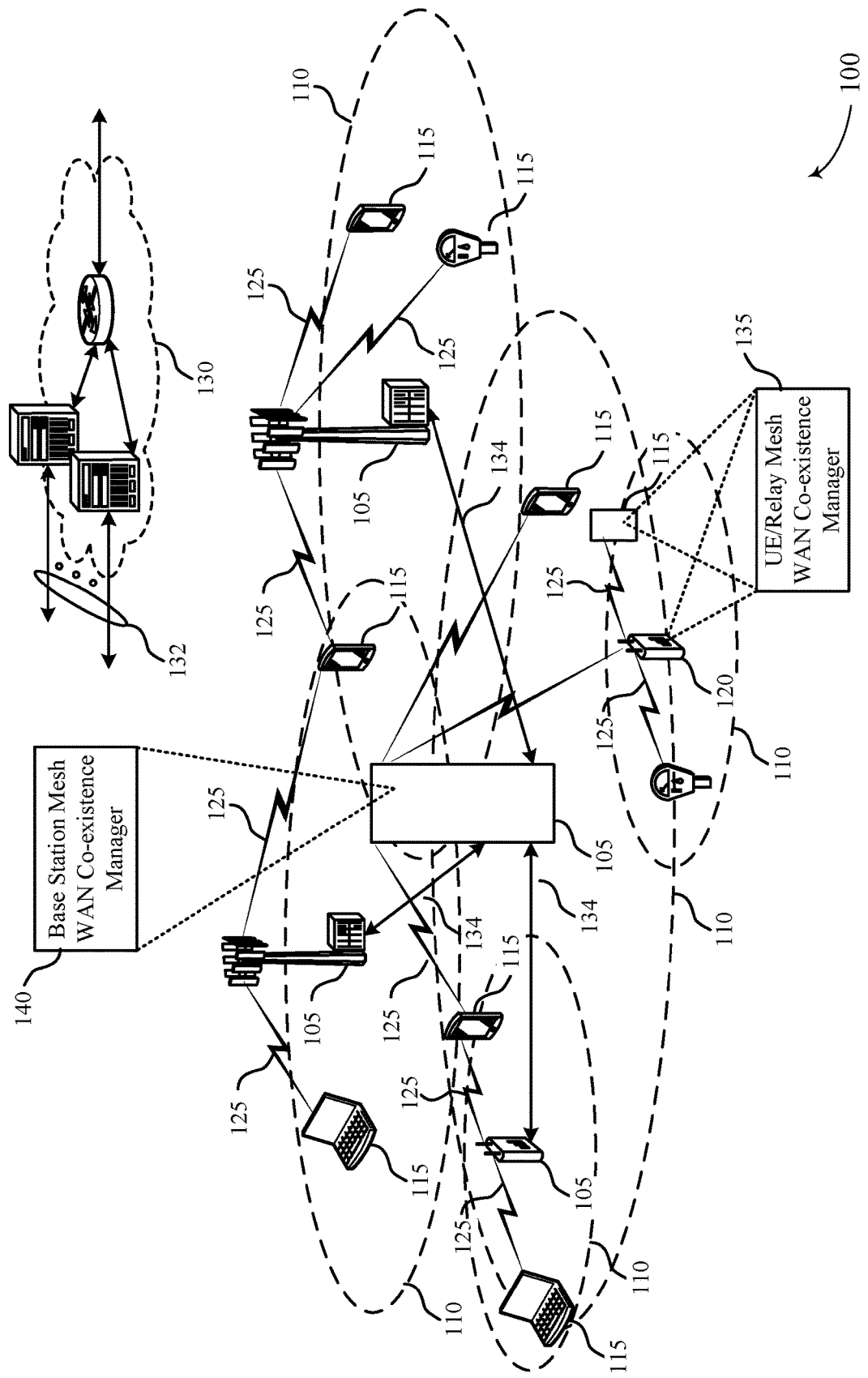
FIG. 1 illustrates an example of a wireless communications system that supports mechanisms for co-existence between communication modes in a mesh WAN, in accordance with one or more aspects of the present disclosure.

Mechanisms for co-existence between different communication modes implemented in a wireless network may be used to decrease interference between wireless devices in the wireless network. For example, a wireless device (e.g., a UE) in a location with poor wireless communication coverage may use other wireless devices (e.g., relays) to indirectly communicate with a central node (e.g., a base station) in a mesh WAN. Communications between a relay and an associated UE, or between a first relay and a second relay, may be referred to as D2D communications. In some examples different communication modes may be used to perform D2D communication in the mesh WAN. For example, relays may provide distributed scheduling by scheduling associated UEs and/or other relays for communications, or the UEs and/or other relays may communicate with the relay using contention-based protocols (e.g., request-to-send (RTS)/clear-to-send (CTS)).

In some examples, wireless devices using one D2D communication mode may interfere with wireless devices using another communication mode. For example, a first wireless device configured to use a scheduled communication scheme and a second wireless device configured to use a contention-based communication scheme may transmit at the same time, during overlapping times, or during periods that may otherwise cause interference. For example, the second wireless device may transmit signals associated with a contention procedure for a wireless communication medium, which may overlap with scheduled transmissions of the first wireless device. In such examples, the scheduled transmissions of the first wireless device may not be received properly by a target device, and/or the contention for the wireless communication medium for the second wireless device may be unsuccessful. In some examples the first wireless device may transmit a scheduled transmission during a time period where the second wireless device is performing a listening operation of a contention procedure, in which case the second wireless device may not be clear to access the wireless communication medium. In some examples, a wireless device (e.g., a machine type communication (MTC) device, a low-power device, a device that is used intermittently, a device operating according to a discontinuous reception (DRX) or discontinuous transmission (DTX) configuration) may be operating according to sleep and/or wake-up periods, and interference from other nearby wireless devices may prevent communications with such a device, and/or may lengthen wake durations and/or shorten sleep durations. Co-existence mechanisms described in the present disclosure may decrease occurrence of interference between wireless devices, and facilitate a more-efficient utilization of wireless communication resources.

In one example of co-existence mechanisms, a wireless device of a mesh WAN (e.g., a UE and/or a relay) using either of the D2D communication modes (e.g., either a scheduled communication scheme or a contention-based communication scheme) may identify wireless communication resources that have been set aside for D2D communications. The wireless communication resources may be partitioned into TTIs (e.g., slots, symbol periods, subframes, frames, etc.) that designate intervals for uplink/downlink communications. The wireless device may select one or more TTIs (TTIs) of the identified communication resources to be reserved for subsequent communications. Reserving the TTI(s) may include transmitting, during a second discovery interval, an indication (e.g., a reservation indicator, etc.) that the selected TTI(s) are reserved. Other wireless devices in the mesh WAN may detect the indication, identify the reserved TTI(s), and refrain from transmitting during the reserved TTI(s). In some examples, another wireless device in the mesh WAN may measure a signal strength of a reservation indication, and if the measured signal strength is below a threshold, the other wireless device may transmit during the reserved TTI(s) simultaneously with the wireless device that transmitted the reservation indication.

In another example of co-existence mechanisms, a central node of a mesh WAN (e.g., a base station) may allocate communication resources to D2D communications, during which the base station may refrain from scheduling associated devices (e.g., refrain from direct communications). The central node may also assign a communication mode (e.g., a scheduled communication scheme or a contention-based communication scheme) to the D2D communication resources. Wireless devices (e.g., UEs and/or relays) using the assigned communication mode may transmit using the allocated D2D communication resources, while wireless devices using the other communication mode may refrain from transmitting using the allocated D2D communication resources. The assignment of a D2D communication mode to allocated D2D communication resources may be indicated to wireless devices in the mesh WAN, and a wireless device using the indicated D2D communication mode may use the allocated D2D communication resources without experiencing interference from other devices using a different D2D communication mode.

Features of the disclosure introduced above are further described below in the context of a wireless communication system. Specific examples are then described of example process flows for mechanisms for co-existence between communication modes in a mesh WAN. These and other features of the disclosure are further illustrated by and described with reference to apparatus diagrams, system diagrams, and flowcharts that relate to mechanisms for co-existence between communication modes in a mesh WAN.

FIG. 1 illustrates an example of a wireless communications system 100 that supports mechanisms for co-existence between communication modes in a mesh WAN, in accordance with one or more aspects of the present disclosure. The wireless communications system 100 includes base stations 105, UEs 115, relays 120, and a core network 130. In some examples, the wireless communications system 100 may be an LTE and/or LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115.

UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a wireless communications device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, an Internet of things (IoT) device, an Internet of Everything (IoE) device, an MTC device, an appliance, an automobile, etc. A UE may be able to communicate with various base stations and network equipment, including macro eNBs, small cell eNBs, relay base stations, and the like. A UE may also be able to communicate using different radio access technologies (RATs), such as a cellular RAT (e.g., an LTE/LTE-A RAT), a Wi-Fi RAT, or other RATs.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a UE 115, a relay 120, and/or a base station 105 may operate in a shared radio frequency spectrum band (e.g., an unlicensed radio frequency spectrum band, a radio frequency spectrum band where accessing devices contend for access, etc.). These devices may perform a CCA prior to communicating in order to determine whether the channel is available. A CCA may include an energy detection procedure to determine whether there are other active transmissions at a particular time. For example, the device may infer that a change in a received signal strength indicator (RSSI) of a power meter indicates that a channel is occupied. Signal power that is concentrated in a certain bandwidth and exceeds a predetermined noise floor may indicate that another wireless transmitter is using that bandwidth. A CCA may also include detection of specific sequences that indicate use of the channel. For example, another device may transmit a specific preamble prior to transmitting a data sequence.

In some examples, wireless communications system 100 may be a mesh WAN, and base station 105 may be an example of a central node of the mesh WAN, in accordance with one or more aspects of the present disclosure. A mesh WAN may be used to support the internet-of-things (IoT), for example, which may refer to a network of wireless devices that autonomously collect and exchange data with one another. A mesh WAN may include relays 120 to expand the networks coverage to locations with poor channel conditions (e.g., a basement). In some examples, UEs 115 in a mesh WAN may be used as relays 120 for other UEs 115. UEs 115 that are configured to act as relays 120 (e.g., UEs 115 that meet certain power requirements, frequency requirements, computing requirements, etc.) may advertise their capabilities to nearby UEs 115. These relays 120 may act as a waypoint for communications between a base station 105 and associated UEs 115 (e.g., "leaf UEs", other relays 120, etc.) located in areas with poor wireless communication coverage of the base station 105. A mesh WAN may also support scheduling direct communications between a base station and UEs 115 in areas with preferred network coverage. Multiple communication modes may therefore be implemented in a mesh WAN to support a combination of direct scheduling and indirect scheduling.

In some examples, a mesh WAN may support up to four communication modes. A first communication mode may be fully scheduled by a central node. For example, when acting as a central node, a base station 105 may schedule each device (e.g., each relay 120 and UE 115 associated with the base station 105) for communications. A second communication mode may be partially scheduled by a central node and partially scheduled by a relay 120. That is, in some examples a base station 105 may be used to schedule direct communications (e.g., sending a physical downlink control channel (PDCCH)) with UEs 115 and relays 120 and may also be used to schedule indirect communications (e.g., D2D communications) for UEs 115 associated with a relay 120. In some examples of the second communication mode, the relays 120 may be used to schedule D2D communications (e.g., sending a PDCCH) with their associated UEs 115. A third communication mode may also be partially scheduled by a central node and a relay 120. In the third communication mode, however, the central node may be used to schedule only direct communications and may cede control (or "gap out") to the relays 120 for scheduling D2D communications. In a fourth communication mode, a central node may also gap out during D2D communications. However, unlike the third communication mode in which the relays 120 schedule the associated UEs 115, in the fourth communication mode the UEs 115 may use contention-based protocols to communicate with a relay 120.

In some examples, the wireless communications system 100 may implement communication modes independently or may implement different combinations of the communication modes simultaneously. For instance, one relay 120 and its associated UEs 115 may use the third communication mode to perform D2D communications (e.g., relay-scheduled communications), while another relay 120 and its associated UEs 115 may use the fourth communication mode to perform D2D communications (e.g., contention-based communications). In some examples that lack mechanisms for co-existence between communication modes, transmissions by UEs 115 and relays 120 using the third communication mode may interfere with transmissions by UEs 115 and relays 120 using the fourth communication mode.

To support the co-existence mechanisms described in the present disclosure, wireless devices in a mesh WAN, such as a base station 105, a UE 115, and/or a relay 120 may include a mesh WAN co-existence manager, such as a UE/Relay mesh WAN co-existence manager 135 or a base station mesh WAN co-existence manager 140, to implement co-existence mechanisms in a mesh WAN. In one example, a relay 120 (e.g., using a UE/Relay mesh WAN co-existence manager 135) receives a communications schedule from a base station 105 that indicates direct communication resources and D2D communication resources. The relay 120 may be operating using either of the third communication mode or fourth communication mode, and may identify the indicated D2D communication resources. The D2D communication resources may be partitioned into TTIs, and the relay 120 may select one or more of the TTIs for subsequent communications. The relay 120 may transmit an indication that the selected TTI(s) are reserved. In this way, the relay 120 may alert nearby devices (e.g., devices within communication range of relay 120) of what TTIs it will use for transmissions, thereby preventing interfering wireless devices from transmitting during the reserved TTI. Although some operations are described with reference to relays 120, in some examples, similar operations may also be performed by a UE 115 (e.g., using a UE/Relay mesh WAN co-existence manager 135) to select TTIs from indicated D2D communication resources, and similarly indicate that selected TTIs are reserved by the UE 115.

In another example, a base station 105 (e.g., using a base station mesh WAN co-existence manager 140) may allocate a first set of communication resources for direct communications and a second set of communication resources for D2D communications to schedule communications over a wireless network. Wireless devices (e.g., UEs and/or relays) in the wireless network may perform D2D communications using one of a first mode or a second mode. The base station 105 may assign the second set of communication resources to wireless devices using the first mode (e.g., a scheduled communication scheme or a contention-based communication scheme), and transmit an indication that the second set of communication resources is reserved for the wireless devices using the first mode. In this way, devices performing communications using the first mode may do so without experiencing interference from devices performing communications using the second mode, thereby improving utilization of the second set of communication resources for D2D communications.

Figure 2A:
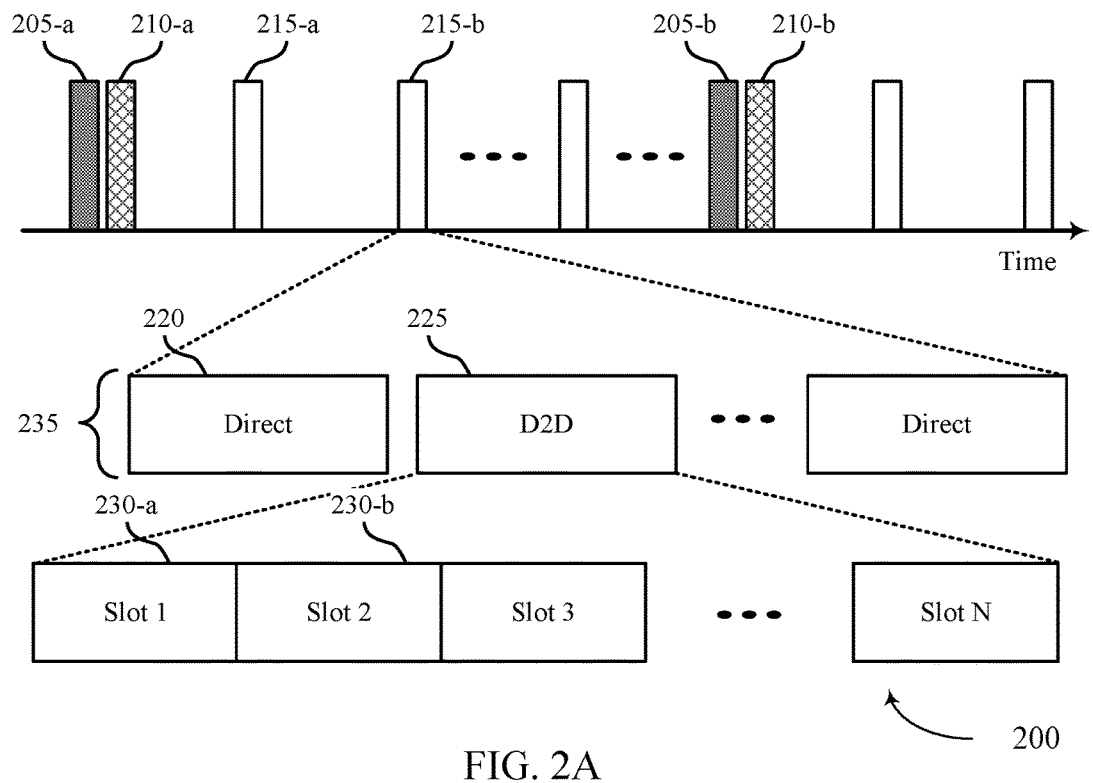
FIG. 2A illustrates an example of a communication sequence that supports mechanisms for co-existence between communication modes in a mesh WAN in accordance with one or more aspects of the present disclosure.

FIG. 2A illustrates an example of a communication sequence 200 that supports mechanisms for co-existence between communication modes in a mesh WAN, in accordance with one or more aspects of the present disclosure. Communication sequence 200 may include first discovery intervals 205, second discovery intervals 210, and data intervals 215. Data intervals 215-$b$ may include direct communication resources 220 and/or D2D communication resources 225 that use frequency resources 235. D2D communication resources 225 may be further portioned into slots 230.

As described in the present disclosure, a mesh WAN may be used to support communication with IoT devices. In some examples IoT devices may be associated with limited battery life, and therefore, may enter a deactivated state (e.g., a sleep state) when not communicating (e.g., between data intervals 215-$a$ and 215-$b$) to conserve power. In some examples, entering a sleep state may include disabling a receiver/transmitter chain of the device. In order to support a sleep state for wireless devices (e.g., UEs and/or relays) across the mesh WAN, wireless devices of the mesh WAN may enter an active state (e.g., wake up, enter an awake state) at a predetermined interval. In some examples, the predetermined interval may be associated with the first discovery intervals 205, such that wireless devices across the mesh WAN are awake to communicate during the first discovery intervals 205. During a first discovery interval 205, wireless devices that are configured to act as relays (e.g., relays 120 described with reference to FIG. 1) may advertise relay parameters such as a device identifier, a wake-schedule for the wireless device and associated wireless devices, in addition to energy, latency, and association parameters. A first discovery interval 205 may be associated with a set of resources, and each relay may identify and select a unique subset of the set of the associated resources for advertising relay parameters. Wireless devices that receive the advertised relay parameters of a first discovery interval 205 may measure signal strengths of communications from multiple relays and associate with a relay based at least in part on the measured signals (e.g., with a relay associated with a strongest signal as measured by the wireless device) and/or the received parameters.

In some examples, a relay and its associated wireless devices (e.g., UEs and/or other relays) may wake up at intervals according to a wake-up schedule of the relay. For instance, the wireless devices may wake up during data intervals 215 to communicate with the relay. In some examples, multiple types of communication (e.g., communications using multiple communication modes) are scheduled during a data interval 215, such as direct communications and D2D communications. In some examples, data intervals 215 may be assigned numbers for identification purposes, such as superframe numbers. Wireless devices (e.g., relays and their associated wireless devices) that wake up during data interval 215-$b$, for example, may communicate using either direct communication resources 220 or D2D communication resources 225 based on a configured communication mode (e.g., a configuration of the wireless device, which may include a scheduled communication scheme, or a contention-based communication scheme, or a combination thereof). For instance, wireless devices configured for a D2D communication mode may communicate using D2D communication resources 225. Direct communication resources 220 or D2D communication resources 225 may both use frequency resources 235 (e.g., one or more carriers, subcarriers, channels, radio frequency spectrum bands). Communication resources, such as D2D communication resources 225, may be further partitioned into slots 230, which designate time boundaries for beginning and/or concluding transmission intervals.

Figure 2B:
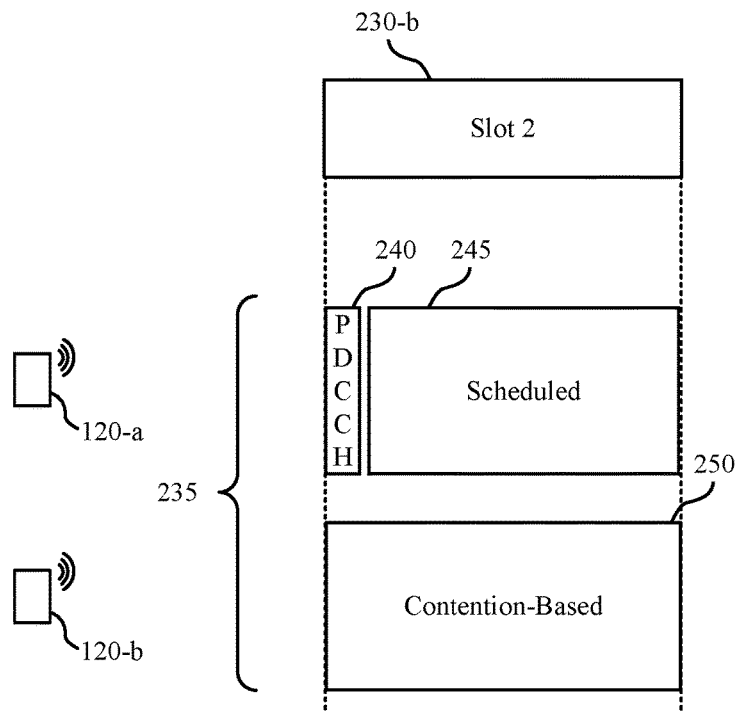
FIG. 2B illustrates an example of interference between different communication modes in a mesh WAN, in accordance with one or more aspects of the present disclosure.

In some examples, wireless devices may use one of two communication modes to perform D2D communications (e.g., a scheduled communication scheme or a contention-based communication scheme), and in some cases, transmissions between wireless devices using the different communication modes may interfere with one another. For instance, FIG. 2B illustrates an example of interference between different communication modes in a mesh WAN, in accordance with one or more aspects of the present disclosure. As shown in FIG. 2B, a first relay 120-a and a second relay 120-b may each transmit a D2D communication during slot 230-b. Relay 120-a may communicate using a first communication mode that is associated with relay-scheduled communications, while relay 120-b may communicate using a second communication mode that is associated with contention-based communications.

Communications from the first relay 120-a may include a relay-PDCCH 240 that is used to schedule associated wireless devices to communicate with the first relay 120-a during scheduled communications 245. Communications from the second relay 120-b may not include a PDCCH and may instead include contention-based communications 250, whereby communication resources may be accessed by wireless devices to communicate with relay 120-b using contention-based protocols such as RTS/CTS, carrier sense multiple access (CSMA), etc. In the example of FIG. 2B, relays 120-a and 120-b may communicate with their associated wireless devices using the same frequency resources 235 (e.g., using the same radio frequency spectrum band(s)). Thus, transmissions of the first relay 120-a, the second relay 120-b, and their associated wireless devices, may interfere with one another during slot 230-b. For instance, an RTS sent at the beginning of contention-based communications 250 may interfere with a nearby wireless device receiving the relay-PDCCH 240 from the first relay 120-a.

To support co-existence between devices operating with different communication modes, a second discovery interval 210 (e.g., second discovery intervals 210-a or 210-b of FIG. 2A) may be used by wireless devices of the mesh WAN, such as relays 120-a and 120-b, or other wireless devices associated with the relays 120-a and 120-b (e.g., UEs 115 and/or other relays 120 associated with the relays 120-a and 120-b), to reserve certain slots 230 for communications. For example, the first relay 120-a may transmit an indication (e.g., a reservation indicator) during the second discovery interval 210-a, indicating that the time and frequency resources associated with slot 230-b are reserved for transmission to/from the first relay 120-a. The indication may include a slot index, periodicity information and/or offset information. In various examples the indication may indicate slot(s) 230 in one data interval 215, or the indication may indicate slot(s) 230 across multiple data intervals 215. The second relay 120-b and its associated wireless devices may detect and process the indication and may subsequently refrain from contending for access during slot 230-b. In some examples, the second relay 120-b and its associated wireless devices may measure a signal strength of the indication during the second discovery interval 210, and those wireless devices that determine the measured signal strength to be below a threshold may continue contending for access during slot 230-b. Relays 120-a and 120-b may select resources for transmitting discovery parameters during a first discovery interval 205 as described in the present disclosure. In some examples, relays 120-a and 120-b may use the same resources selected during first discovery interval 205 in second discovery interval 210 (e.g., resources having a same radio frequency spectrum band, a same slot index, or a same offset). In some examples, first discovery interval 205 and second discovery interval 210 include resources that are left unoccupied to support the arrival of new relays 120 or UEs 115 in the mesh WAN.

Utilizing a second discovery interval 210 may increase resource utilization efficiency of a mesh WAN. For instance, wireless devices may wake up during portions of the second discovery interval 210-a based at least in part on parameters received during the first discovery interval 205-a. For instance, a wireless device may wake up during slots of the second discovery interval 210-a to listen for reservation indicators transmitted by other wireless devices with wake-up periods that overlap with a wake-up period of the wireless device. Accordingly, the wireless device may avoid detecting and following slot reservations made by nearby devices that transmit while the wireless device is in a sleep state. Furthermore, a wireless device may share (e.g., co-occupy) communication resources with nearby devices having common wake-up periods when the nearby devices do not substantially interfere with the communications of the wireless device (e.g., by measuring a signal strength of a reservation indication and determining that the interference is below a threshold). In this way, the throughput of the mesh WAN system may be increased.

Figure 3A:
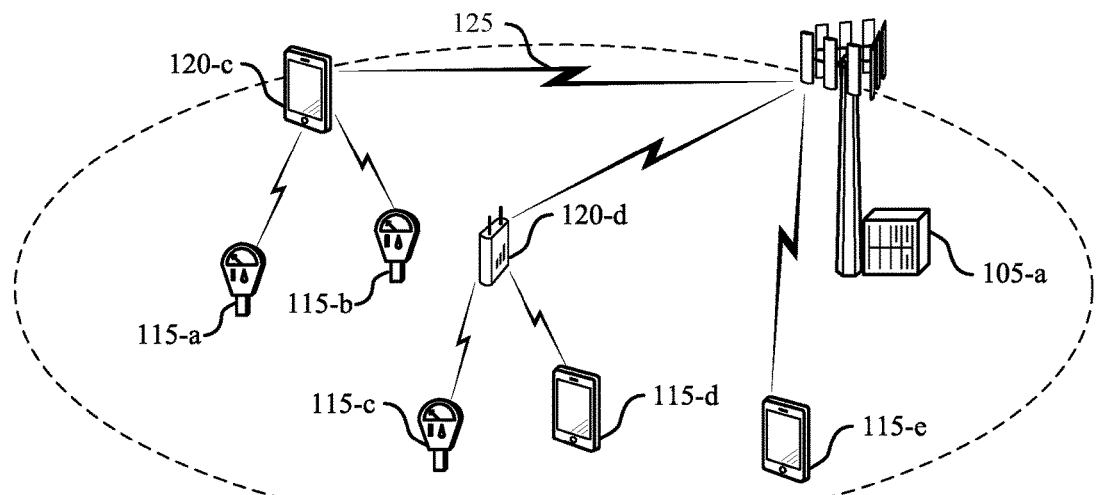
FIG. 3A illustrates an example of a wireless communication subsystem that supports mechanisms for co-existence between communication modes in a mesh WAN, in accordance with one or more aspects of the present disclosure.

FIG. 3A illustrates an example of a wireless communications subsystem 300 that supports mechanisms for co-existence between communication modes in a mesh WAN, in accordance with one or more aspects of the present disclosure. Wireless communications subsystem 300 may include UE 115-a, UE 115-b, UE 115-c, UE 115-d, UE 115-e, relay 120-c, relay 120-d, and base station 105-a, which may be examples of a UE 115, relay 120, or a base station 105, and may communicate with one another using communication links 125 as described with reference to FIGS. 1 through 2B. In the wireless communications subsystem 300, base station 105-a may communicate directly with relays 120-c and 120-d and UE 115-e, and may communicate indirectly with UEs 115-a through 115-d. Relay 120-c and the associated UEs 115-a and 115-b may use a scheduled D2D communication mode, while relay 120-d and the associated UEs 115-c and 115-d may use a contention-based D2D communication mode. Wireless communications subsystem 300 may implement mechanisms for co-existence between the devices using the scheduled D2D communication mode and the devices using the contention-based D2D communication mode. In some examples, relays 120-c and 120-d may use slot reservation techniques to prevent other devices from performing interfering communications during a reserved slot. In some examples, the base station 105-a may act as a central node of a mesh WAN, and the base station 105-a may assign a D2D communication mode to a set of D2D communication resources to prevent devices using another D2D communication mode from performing interfering communications.

Figure 3B:
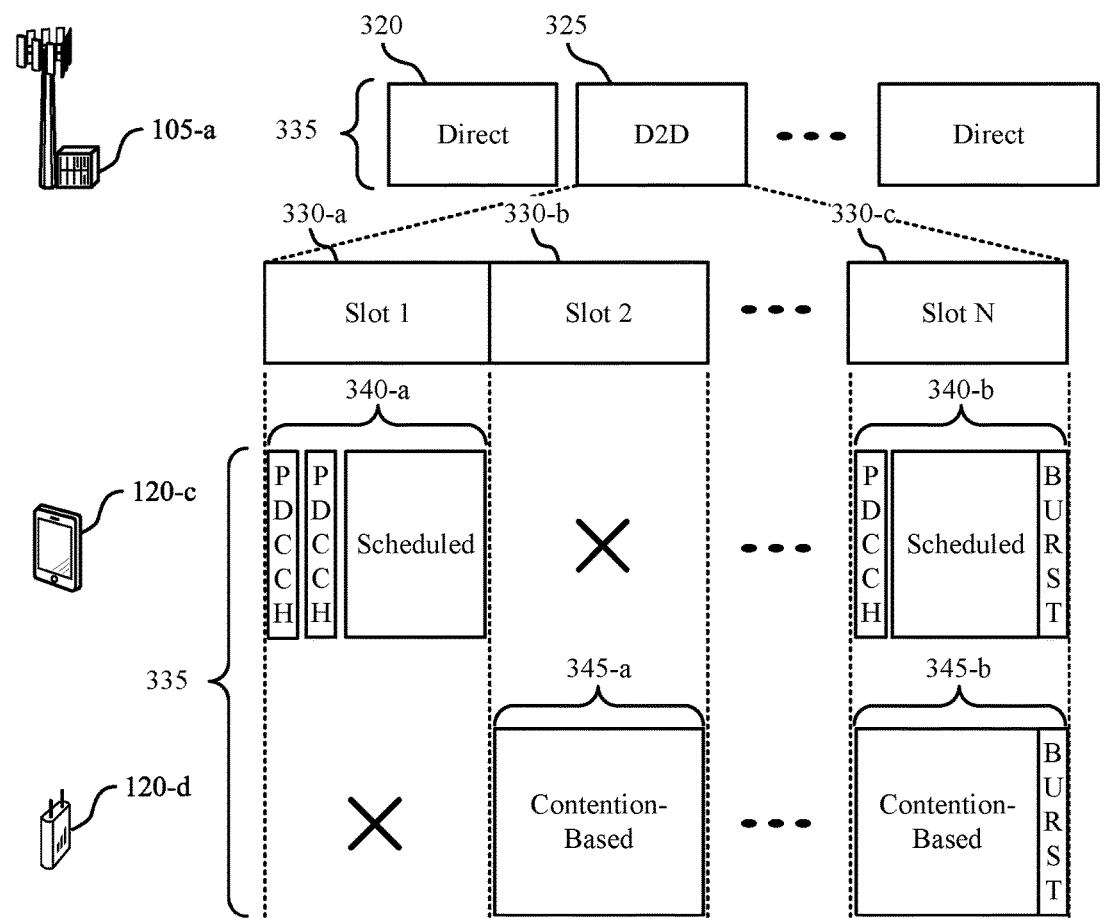
FIG. 3B illustrates an example of a mesh WAN communication that supports mechanisms for co-existence between communication modes in a mesh WAN in accordance with one or more aspects of the present disclosure.

FIG. 3B illustrates an example of a mesh WAN communication 305 that supports mechanisms for co-existence between communication modes in a mesh WAN, in accordance with one or more aspects of the present disclosure. The mesh WAN communication 305 may be performed, for example, by the wireless communications subsystem 300 described with reference to FIG. 3A. In the example of FIG. 3B, base station 105-*a* may determine a communication schedule that allocates direct communication resources 320 (e.g., for transmission between the base station 105-*a* and relay 120-*c*, relay 120-*d*, and/or UE 115-*e*) and D2D communication resources 325 (e.g., for transmissions between UEs 115-*a*, 115-*b*, 115-*c*, 115-*d* and their respective relays 120-*c* and 120-*d*). Direct communication resources 320 and D2D communication resources 325 may utilize the same frequency resources 335 (e.g., share a common radio frequency spectrum band). D2D communication resources 325 may be partitioned into slots 330 as described with reference to FIG. 2A.

To support D2D communications, the first slot 330-*a* and the last slot 330-*c* of D2D resources 325 may include modified frame structures to coincide with the frame structure used for direct communications. That is, the scheduled communication 340-*a* in the first slot 330-*a* may begin with a PDCCH from base station 105-*a*, while in the last frame 330-*c* scheduled communication 340-*b* and contention-based communication 345-*b* may conclude with a common uplink burst interval. As described with reference to FIGS. 2A and 2B, relays 120-*c* and 120-*d* may reserve a slot 330 for communications with their respective devices (e.g., UEs 115-*a* through 115-*d*, or other relays (not shown)). For example in FIG. 3B, relay 120-*c* may select the first slot 330-*a* for reservation to communicate with UE 115-*b* and may select the Nth slot 330-*c* for reservation to communicate with UE 115-*a*, while relay 120-*d* may select the second slot 330-*b* for reservation to communicate with UE 115-*c* and select the Nth slot 330-*c* for reservation to communicate with UE 115-*d*. Relays 120-*c* and 120-*d* may broadcast (e.g., during a second discovery interval) reservation indicators indicating which slots have been selected for reservation, as described with reference to FIG. 2A. In some examples, the associated UEs 115-*a* through 115-*d* may also broadcast the reservation indicators. For example, the relays 120-*c* and 120-*d* may provide an indication of selected slots for reservation to one or more of the UEs 115-*a* through 115-*d*, and the UEs 115-*a* through 115-*d* may broadcast reservation indicators indicating the selected slots. In some examples, the UEs 115-*a* through 115-*d* may have received a prior reservation indicator indicating a periodically reserved slot, and the UEs 115-*a* through 115-*d* may broadcast a reservation indicator indicating the periodically reserved slot. In another example, the UEs 115-*a* through 115-*d* may have selected their own slots for reservation, and the UEs 115-*a* through 115-*d* may broadcast reservation indicators indicating the slot(s) reserved by the respective UE 115. The reservation indicators may be received by devices in the mesh WAN such as UEs 115-*a* through 115-*d*, in addition to relays 120-*c* and 120-*d*. These devices may measure a signal strength of the broadcast reservation indicators and may determine whether to refrain from transmitting during a slot 330 indicated by another device to be reserved.

For example, relay 120-*c* and/or UE 115-*b* may transmit a reservation indicator for the first slot 330-*a*. Relay 120-*d* and UE 115-*c* may detect the reservation indicator and may determine that the signal strength of the detected reservation indicator is greater than a threshold value. Accordingly, UE 115-*b* and relay 120-*c* may perform scheduled communication 340-*a*, while relay 120-*d* and UE 115-*c* may refrain from transmitting on frequency resources 335 during the first slot 330-*a*. Similarly, relay 120-*d* may transmit a reservation indicator to reserve the second slot 330-*b* for contention-based communication 345-*a*. UE 115-*a* and relay 120-*c* may transmit a reservation indicator for the Nth slot 330-*c*. Relay 120-*d* and UE 115-*d* may detect the reservation indicator and may determine that the signal strength of the detected reservation indicator is less than a threshold value. Accordingly, UE 115-*b* and relay 120-*c* may perform scheduled communication 340-*b*, while relay 120-*d* and UE 115-*d* may concurrently perform contention-based communication 345-*b* during the Nth slot 330-*c*. In this way, devices in wireless communications subsystem 300-*a* may efficiently utilize the system resources while mitigating interference between one another.

According to another mechanism to support coexistence between communication modes in a mesh WAN, base station 105-*a* may assign a certain communication mode to a D2D communication resources. For instance, base station 105-*a* may assign a scheduled communication scheme to D2D communication resources 325, or a portion thereof. Accordingly, wireless devices using the scheduled communication scheme (e.g., relay 120-*c*, UE 115-*a*, and UE 115-*b*) may perform communications using D2D communication resources 325, while wireless devices using the contention-based communication scheme (e.g., relay 120-*d*, UE 115-*c*, and UE 115-*d*) may refrain from communicating using D2D communication resources 325. In another example, base station 105-*a* may assign a contention-based communication scheme to D2D communication resources 325. In such an example, wireless devices using the contention-based communication scheme (e.g., relay 120-*d*, UE 115-*c*, and UE 115-*d*) may perform communications using D2D communication resources 325, while wireless devices using the scheduled communication scheme (e.g., relay 120-*c*, UE 115-*a*, and UE 115-*b*) may refrain from communicating using D2D communication resources 325. In some examples the base station may assign a certain communication mode to a first set of D2D communication resources, and assign a different communication mode to a second set of D2D communication resources. In some examples the base station 105-*a* may transmit a configuration message configuring a UE 115 to perform D2D communications using the communication mode assigned to the D2D communication resources (e.g., configuring UE 115-*a* or UE 115-*b* to perform D2D communications using a scheduled communication scheme, configuring UE 115-*c* or UE 115-*d* to perform D2D communications using a contention-based communication scheme, etc.). In some examples, a wireless device may be configured to perform D2D communications according to more than one communication mode, but may perform D2D communications according to a communication mode assigned to D2D communication resources while refraining from performing D2D communications according to a communication mode not assigned to the D2D communication resources.

Figure 4A:
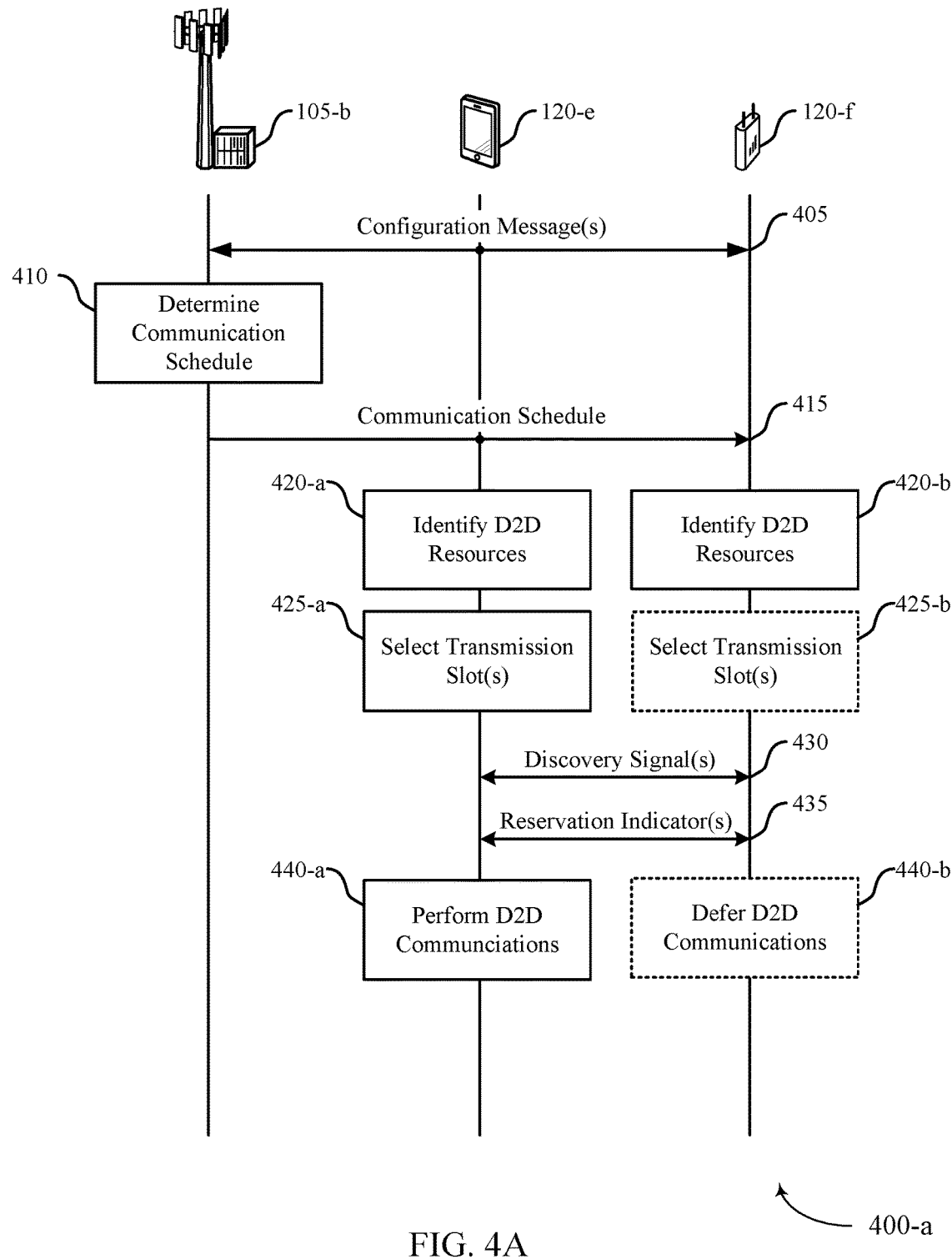
FIGS. 4A and 4B illustrate example process flows that support mechanisms for co-existence between communication modes in a mesh WAN, in accordance with one or more aspects of the present disclosure.

FIG. 4A illustrates an example of a process flow 400-*a* that supports mechanisms for co-existence between communication modes in a mesh WAN, in accordance with one or more aspects of the present disclosure. Process flow 400-*a* may be performed by a first relay 120-*e*, a second relay 120-*f*, and a base station 105-*b*, which may be an example of one or more aspects of relays 120 and base stations 105 described with reference to FIGS. 1 through 3B. In some examples, relays 120-*e* and 120-*f* utilize slot reservation techniques to reserve slots of resources allocated for D2D communication.

In the example of FIG. 4A, the first relay 120-*e* may operate according to a scheduled D2D communication mode, while the second relay 120-*f* may operate according to a contention-based D2D communication mode. In other examples, the first relay 120-*e* and the second relay 120-*f* may operate according to the same communication mode. In some examples one or both of the first relay 120-*e* or the second relay 120-*f* may be examples of a UE 115 that is associated with or is configured to operate as a relay. Although operations of process flow 400-*a* are described with reference to relays 120, in some examples such operations may be similarly performed by or with one or more UEs 115 (e.g., a leaf UE).

At 405, base station 105-*b* may transmit (e.g., broadcast) a configuration message, which may be received by the first relay 120-*e* and the second relay 120-*f*. In some examples, the configuration message may be used to configure relays 120-*e* and 120-*f* to use either a direct communication mode or a D2D communication mode (e.g., based on a location of the relays, a power limitation of the relays, etc.). In some examples, relays 120-*e* and 120-*f* may use one of a scheduled communication scheme or a contention-based communication scheme to perform D2D communications. In some examples, the configuration message may be used to configure the first relay 120-*e* to use a scheduled D2D communication mode and the second relay 120-*f* to use a contention-based D2D communication mode. In another example, relays 120-*e* and 120-*f* may be user-configured or dynamically self-configured based at least in part on environmental factors, such as the density of wireless devices in the network, interference, location, etc. In examples where the relays 120-*e* and 120-*f* are user-configured or otherwise self-configured, the relays 120-*e* and 120-*f* may indicate the configured communication mode to base station 105-*b* (e.g., at 405).

At 410, the base station 105-*b* may determine a communication schedule for a set of network resources. In some examples, determining the communication schedule includes partitioning the set of network resources by allocating a first set of resources to direct communications and a second set of network resources to D2D communications. In some examples, relay 120-*g* and 120-*h* may communicate with other wireless devices (e.g., with UEs or other relays) over D2D communication resources using one of two communication modes—e.g., based on a configured D2D communication mode.

At 415, the base station 105-*b* may transmit the determined communication schedule, which may be received by relays 120-*e* and 120-*f*, and any other UEs and relays in the mesh WAN.

At 420-*a*, relay 120-*e* may identify the communication resources that are set aside for D2D communications, and at 420-*b*, relay 120-*f* may similarly identify the communication resources that are set aside for D2D communications. As described in the present disclosure, the D2D communication resources may be further partitioned into TTIs, such as slots, for performing uplink and downlink communications.

At 425-*a*, the first relay 120-*e* may select slots for performing subsequent communications, and at 425-*b*, the second 120-*f* may also select slots for performing subsequent communications. Selecting slots may include identifying that the slot is not reserved by another wireless device. For instance, the second relay 120-*f* may receive an indication that a slot is reserved by relay 120-*e*, and the second relay 120-*f* may select a different slot based at least in part on the received indication. In some examples, slot selection may be implemented as sequential slot selection during which a first relay (e.g., the first relay 120-*e*) selects a number of slots, a second relay (e.g., the second relay 120-*f*) subsequently selects a different number of slots, and so on. In some examples, the second relay (e.g., the second relay 120-*f*) may refrain from selecting transmission slots. For instance, in some examples, contention-based communication modes may not be configured to use slot reservation as described in the present disclosure, and thus the second relay 120-*f* (e.g., when configured to use a contention-based communication mode) may not select a slot and/or indicate a slot reservation.

At 430, relays 120-*e* and 120-*f* may transmit discovery signal(s) (e.g., during a first discovery interval, such as first discovery intervals 205 described with reference to FIG. 2). Relays 120-*e* and 120-*f* may use a first discovery interval to advertise relay capabilities to wireless devices (e.g., UEs or other relays) in the wireless network. For example, for relay 120-*e* the first discovery signal may include an identifier of relay 120-*e*, a wake-up schedule for relay 120-*e*, transmission parameters, association parameters, communication mode, or any combination thereof. Wireless devices near the relay 120-*e* may use the received parameters to select and associate with the relay 120-*e* (or another relay 120) for performing communications, and in some examples may configure a communication mode based at least in part on the received parameters. In some examples, a set of communication resources may be allocated to the first discovery signal, and relays in the wireless network, including relays 120-*e* and 120-*f*, select unique locations (e.g., time and frequency resources, a slot index, etc.) within the set of communication resources.

In some examples and at 435, the first discovery signal may also include an indication of the selected slots that are reserved by relay 120-*e* (e.g., a reservation indicator). The indication may include a slot index, periodicity information, offset information, or any combination thereof. In some examples, a slot index may be used to identify a slot for a transmission, offset information may be used to identify a location within the slot for a transmissions, and periodicity information may be used to indicate a period that identifies additional locations within the slot or a subsequent slot for subsequent transmissions. Additionally, the indication may identify a wireless device (e.g., a UE or another relay) associated with the relay 120-*e* that will transmit during the slot. In some examples, the timing of the first discovery interval may be based at least in part on a wake-up schedule (e.g., a predetermined schedule, a configured schedule, etc.) that includes a common wake-up period for the relays and UEs in the wireless network, such as relay 120-*e*, relay 120-*f*, and associated UEs and/or other relays. Wireless devices, including both relays and UEs, that receive the reservation indicator may use the reservation indicator to identify slots that are reserved.

At 435, in examples where the first discovery signal does not include the reservation indicator, relay 120-*e* and 120-*f* may transmit the reservation indicator during a second discovery interval (e.g., a second discovery interval 210 as described with reference to FIG. 2). In some examples, relays 120-*e* and 120-*f* may use unique locations identified in the first discovery interval for transmissions in the second discovery interval (e.g., a same slot index, a same offset, etc.). Other wireless devices in the network with overlapping wake-up periods, such as UEs or other relays associated with relays 120-*e* and 120-*f* and other relays, may conserve energy by waking up during the second discovery interval at only those TTIs that correspond to the wake-up period of the wireless device. In one example, relay 120-*f* and its associated UEs and/or other relays listen during the slots of the second discovery interval that overlap or otherwise coincide with the transmission of the reservation indicator by relay 120-*e*.

By waking up to receive only those reservation indicators from wireless devices that share a common wake-up period, a wireless device may ignore reservation indicators from other wireless devices that do not share the common wake-up period. Thus, transmissions that may have interfered with the wireless device may be avoided, because the other wireless devices may be in a sleep state, or otherwise refraining from transmitting, while the wireless device performs communications. This mechanism to support co-existence may increase the number of slots available to the wireless devices for performing subsequent transmissions and increase throughput of the wireless network. In some examples, a UE or another relay scheduled to transmit in a reserved slot may additionally transmit a reservation indicator, which may indicate a slot that selected by the UE or the other relay, or a slot selected by another device for communication with the UE, as described in the present disclosure. In examples where relay 120-f refrains from selecting transmission slots, relay 120-f may also refrain from transmitting reservation indicators.

At 440-a, relay 120-e may perform D2D communications during a slot reserved by relay 120-e (e.g., reserved by the reservation indicator of 435). Before relay 120-f performs D2D communications, relay 120-f may measure a signal strength of a received reservation indicator of 435 (e.g., from relay 120-e, or a UE or another relay associated with relay 120-e) for the slot. If the signal strength of the received reservation indicator is substantially high (e.g., greater than a threshold value), relay 120-f may refrain from performing D2D communications during that slot (e.g., deferring D2D communications at 440-b). Alternatively, if the signal strength is substantially low (e.g., below a threshold), relay 120-f may transmit simultaneously with relay 120-e using the reserved slot (e.g., performing D2D communications at 440-b, not shown).

Figure 4B:
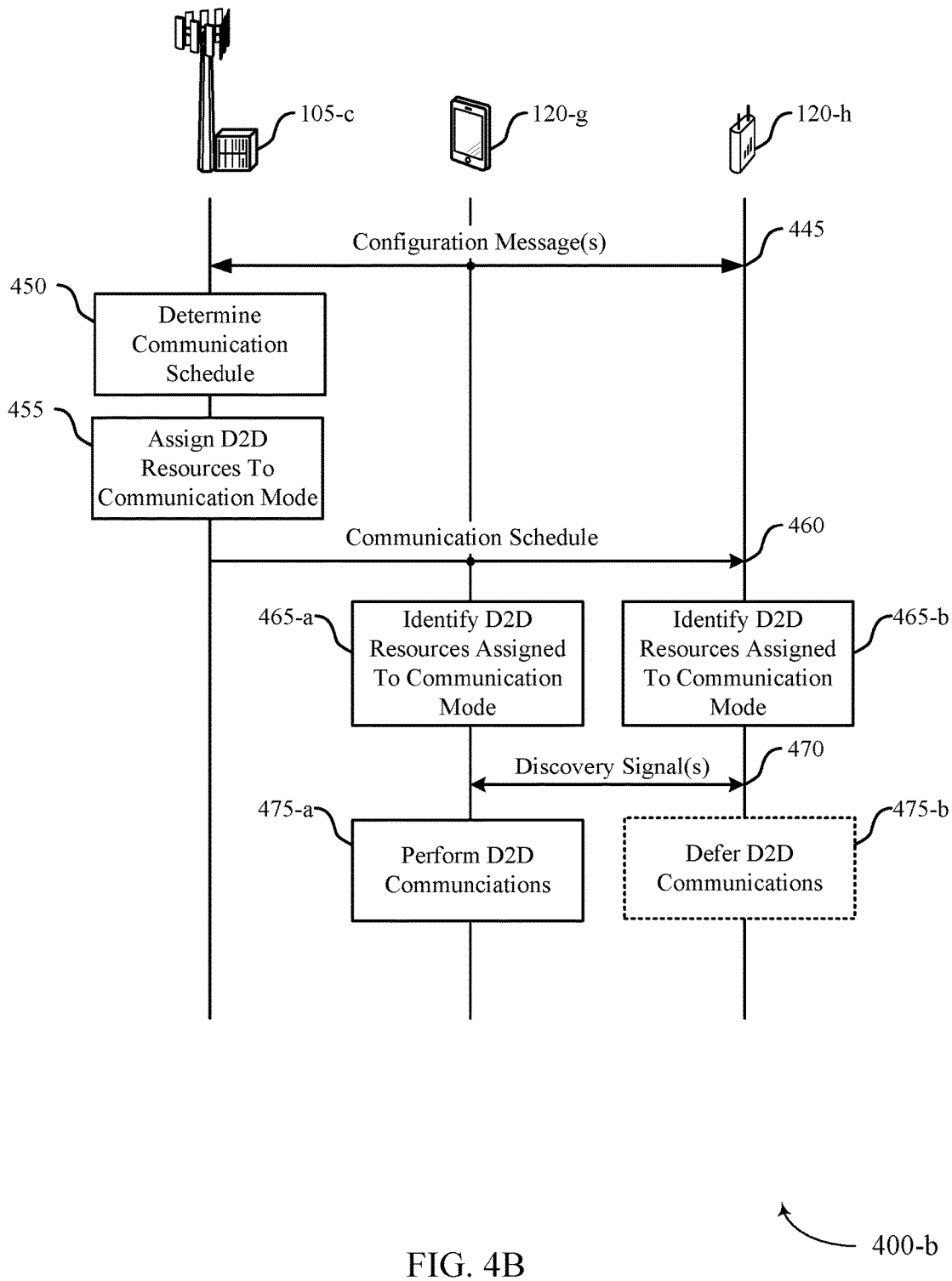

FIG. 4B illustrates an example of a process flow 400-b that supports mechanisms for co-existence between communication modes in a mesh WAN, in accordance with one or more aspects of the present disclosure. Process flow 400-b may be performed by a first relay 120-g, a second relay 120-h, and a base station 105-b, which may be an example of one or more aspects of a relay 120 and base station 105 as described with reference to FIGS. 1 through 3B. According to the example of process flow 400-b, base station 105-c may allocate a set of D2D resources to one communication mode or another (e.g., to a scheduled communication scheme or to a contention-based communication scheme). Although operations of process flow 400-b are described with reference to relays 120, in some examples such operations may be similarly performed by or with one or more UEs 115 (e.g., a leaf UE).

At 445, base station 105-c may transmit (e.g., broadcast) one or more configuration message(s), which may be received by the first relay 120-g and the second relay 120-h. In some examples, the configuration message(s) may be used to configure relays 120-g and 120-h to use either a direct communication mode or a D2D communication mode (e.g., based on a location of the relays, a power limitation of the relays, etc.). In some examples, relays 120-g and 120-h may use one of a scheduled communication scheme or a contention-based communication scheme to perform D2D communications. In some examples, the configuration message(s) may be used to configure the first relay 120-g for a scheduled D2D communication mode and the second relay 120-g to use a contention-based D2D communication mode. Alternatively, the first relay 120-g and the second relay 120-h may determine their own communication modes, as described in the present disclosure, and may indicate the determined communication mode to base station 105-c (e.g., at 445).

At 450, the base station 105-c may determine a communication schedule for subsequent communications in the wireless network. In some examples, determining the communication schedule may include allocating resources to direct communications and D2D communications.

At 455, base station 105-c *may assign a D*2D communication mode (e.g., a scheduled communication scheme or a contention-based communication scheme) to a set of D2D communication resources. In some examples, only those wireless devices that are also configured to use the assigned D2D communication mode may transmit using the assigned D2D communication resources.

At 460, base station 105-c may transmit the communication schedule, which may include the communication mode assignments for the D2D communication resources, and may be received by the first relay 120-g and the second relay 120-h.

For the following discussion of process flow 400-b, an example is described where the base station 105-c assigns a scheduled communication mode to a set of D2D resources, the first relay 120-g is configured for the scheduled communication mode, and the second relay 120-h is configured for a contention-based communication mode.

At 465-a, the first relay 120-g may identify the D2D communication resources and the communication mode assigned to the D2D communication resources (e.g., the scheduled communication mode), and at 465-b, the second relay 120-h may also identify the D2D communication resources and the communication mode assigned to the D2D communication resources.

At 470, relay 120-g and relay 120-h may transmit discovery signals during a first discovery interval. The discovery signals may be received by other relays and UEs in the wireless network and may be used to select and associate with relays 120-g and 120-h.

At 475-a, relay 120-g and its associated wireless devices may perform scheduled communications during the D2D resources that have been identified as assigned to wireless devices using the scheduled communication mode. At 475-b, relay 120-h and its associated wireless devices may refrain from performing contention-based D2D communications based at least in part on identifying that the D2D resources have been assigned to scheduled D2D communications. Alternatively, relay 120-h and its associated wireless devices may perform simultaneous communications with relay 120-g—e.g., based at least in part on identifying that signal strengths of communications to/from relay 120-g are below a threshold—or may defer communicating if the signal strengths are above a threshold.

Figure 5:
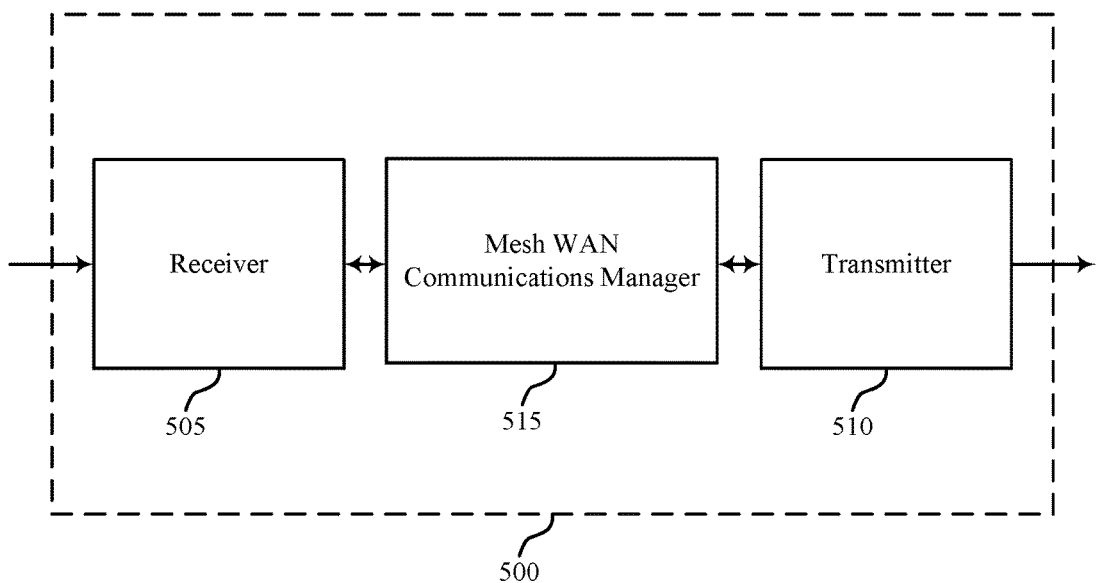
FIGS. 5 and 6 show block diagrams of wireless devices that support mechanisms for co-existence between communication modes in a mesh WAN, in accordance with one or more aspects of the present disclosure.

FIG. 5 shows a block diagram of a wireless device 500 that supports mechanisms for co-existence between communication modes in a mesh WAN, in accordance with one or more aspects of the present disclosure. Wireless device 500 may be an example of one or more aspects of UEs 115 or relays 120 described with reference to FIGS. 1 through 4B. Wireless device 500 may include a receiver 505, a transmitter 510, and a mesh WAN communications manager 515. In some examples, mesh WAN communications manager 515 may be or include a UE/Relay mesh WAN co-existence manager 135 as described with reference to FIG. 1. Wireless device 500 may also include a processor. Each of these components may be in communication with each other.

The receiver 505 may receive information such as packets, user data, or control information associated with various information channels (e.g., control channels, data channels, and information related to co-existence between communication modes in a mesh WAN, etc.). Information may be passed on to other components of the device. The receiver 505 may be an example of one or more aspects of the transceiver 825 described with reference to FIG. 8. The receiver 505 may include a single antenna, or may include a plurality of antennas.

The transmitter 510 may transmit signals received from other components of wireless device 500. In some examples, the transmitter 510 may be collocated with a receiver in a transceiver module. For example, the transmitter 510 may be an example of one or more aspects of the transceiver 825 described with reference to FIG. 8. The transmitter 510 may include a single antenna, or may include a plurality of antennas.

The mesh WAN communications manager 515 may receive (e.g., in cooperation with the receiver 505), from a base station of a wireless network, a schedule for communications over a shared radio frequency spectrum band, the schedule identifying a first set of communication resources allocated to direct communications and a second set of communication resources allocated to D2D communications. In some examples, wireless devices in the wireless network may perform the D2D communications using one of a first mode or a second mode; identify one or more TTIs of the second set of communication resources (e.g., slots); select a TTI from the one or more TTIs; and transmit (e.g., in cooperation with the transmitter 510) an indication that the selected TTI is reserved by the wireless device. The mesh WAN communications manager 515 may be an example of one or more aspects of the mesh WAN communications manager 805 described with reference to FIG. 8.

Figure 6:
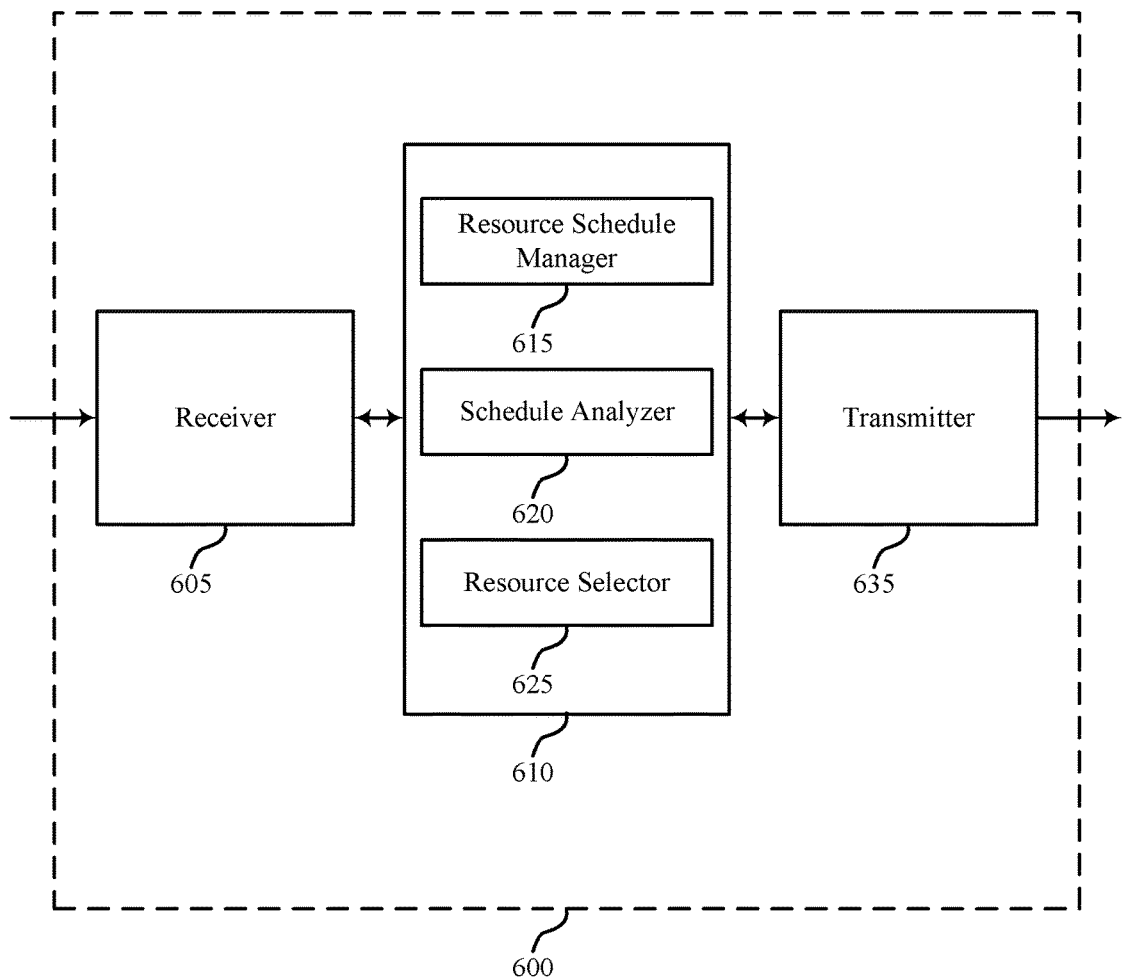

FIG. 6 shows a block diagram of a wireless device 600 that supports mechanisms for co-existence between communication modes in a mesh WAN, in accordance with one or more aspects of the present disclosure. Wireless device 600 may be an example of one or more aspects of a wireless device 500, a UE 115, or a relay 120 described with reference to FIGS. 1 through 5. Wireless device 600 may include a receiver 605, a mesh WAN communications manager 610, and a transmitter 635. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of one or more aspects of the transceiver 825 described with reference to FIG. 8.

The mesh WAN communications manager 610 may be an example of one or more aspects of mesh WAN communications manager 515 described with reference to FIG. 5. The mesh WAN communications manager 610 may include a resource schedule manager 615, a schedule analyzer 620, and a resource selector 625. The mesh WAN communications manager 610 may be an example of one or more aspects of the mesh WAN communications manager 805 described with reference to FIG. 8.

The resource schedule manager 615 may receive (e.g., in cooperation with the receiver 605), from a base station of a wireless network, a schedule for communications over a wireless spectrum, wherein the schedule indicates a first set of communication resources allocated to direct communications and a second set of communication resources allocated to D2D communications. Wireless devices in the wireless network may perform the D2D communications using one of a first mode or a second mode.

The schedule analyzer 620 may identify the second set of communication resources, wherein the second set of communication resources includes one or more TTIs. The resource selector 625 may select a TTI of the one or more TTIs.

The transmitter 635 may transmit signals received from other components of wireless device 600. In some examples, the transmitter 635 may be collocated with a receiver in a transceiver module. For example, the transmitter 635 may be an example of one or more aspects of the transceiver 825 described with reference to FIG. 8. The transmitter 635 may utilize a single antenna, or it may utilize a plurality of antennas. In some examples, the transmitter 635 may transmit an indication that the selected TTI is reserved by the wireless device. In some examples, the transmitter 635 may transmit a transmission in a first discovery interval, the transmission including an identifier of the wireless device, a wake-up schedule for the wireless device, transmission parameters, association parameters, or any combination thereof. In some examples, the transmission is transmitted in the first discovery interval based on a wake-up schedule, the wake-up schedule being used to schedule a common wake-up period for the wireless devices in the wireless network. In another example, the transmitter 635 may transmit the indication in a second discovery interval. In some examples, the indication includes a TTI index (e.g., slot index), periodicity information, offset information, or a combination thereof.

Figure 7:
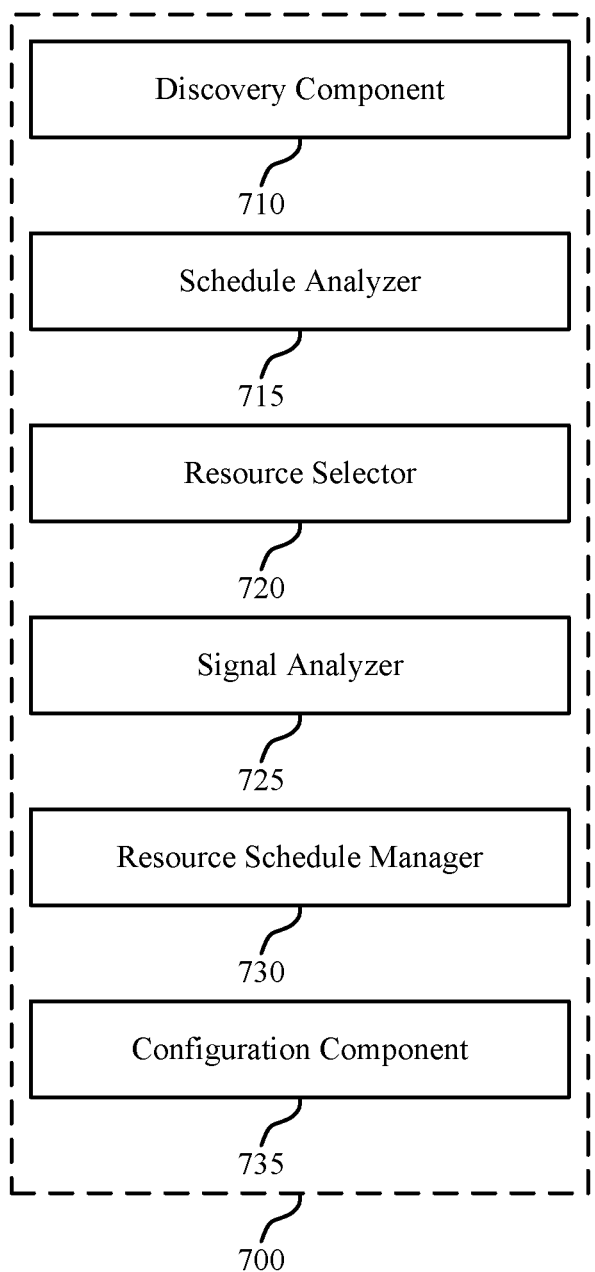
FIG. 7 shows a block diagram of a mesh WAN communications manager that supports mechanisms for co-existence between communication modes in a mesh WAN, in accordance with one or more aspects of the present disclosure.

FIG. 7 shows a block diagram of a mesh WAN communications manager 700 that supports mechanisms for co-existence between communication modes in a mesh WAN, in accordance with one or more aspects of the present disclosure. Mesh WAN communications manager 700 may be an example of the corresponding component of wireless device 500 or wireless device 600. That is, mesh WAN communications manager 700 may be an example of one or more aspects of mesh WAN communications manager 515 or mesh WAN communications manager 610 described with reference to FIGS. 5 and 6. The mesh WAN communications manager 700 may also be an example of one or more aspects of the mesh WAN communications manager 805 described with reference to FIG. 8.

The mesh WAN communications manager 700 may include a discovery component 710, a schedule analyzer 715, a resource selector 720, a signal analyzer 725, a resource schedule manager 730, and a configuration component 735. Each of these modules may communicate, directly or indirectly, with one another (e.g., via one or more buses).

The discovery component 710 may identify a communication resource within the first discovery interval for transmitting the transmission (e.g., in cooperation with a transmitter), use a location of the communication resource in the second discovery interval for transmitting the indication, and identify the second set of communication resources that include one or more TTIs.

The schedule analyzer 715 may receive (e.g., in cooperation with a receiver) a transmission from an another wireless device, where the transmission includes another indication that a different TTI is reserved by the other wireless device. The schedule analyzer 715 may be an example of one or more aspects of the schedule analyzer 620 as described with reference to FIG. 6.

The resource selector 720 may select a TTI based at least in part on the other indication, select a TTI based at least in part on the measured signal strength of the transmission, or select a TTI from the one or more TTIs. In some examples, the selecting includes identifying that the TTI is not reserved by another wireless device. The signal analyzer 725 may measure a received signal strength of the transmission. The resource selector 720 may be an example of one or more aspects of the resource selector 625 as described with reference to FIG. 6.

The resource schedule manager 730 may receive (e.g., in cooperation with a receiver), from a base station of a wireless network, a schedule for communications over a shared radio frequency spectrum band, the schedule identifying a first set of communication resources allocated to direct communications and a second set of communication resources allocated to D2D communications, where wireless devices in the wireless network perform the D2D communications using one of a first mode or a second mode. In some examples, the first mode is associated with a scheduled communication scheme and the second mode is associated with a contention-based communication scheme. In some examples the resource schedule manager 430 may receive a transmission that includes another indication from another wireless device during a discovery interval, where receiving the transmission is based at least in part on a wake-up schedule of the wireless device. The resource schedule manager 730 may be an example of one or more aspects of the resource schedule manager 615 as described with reference to FIG. 6. The configuration component 735 may receive a configuration message configuring the wireless device to perform the D2D communications using the first mode.

Figure 8:
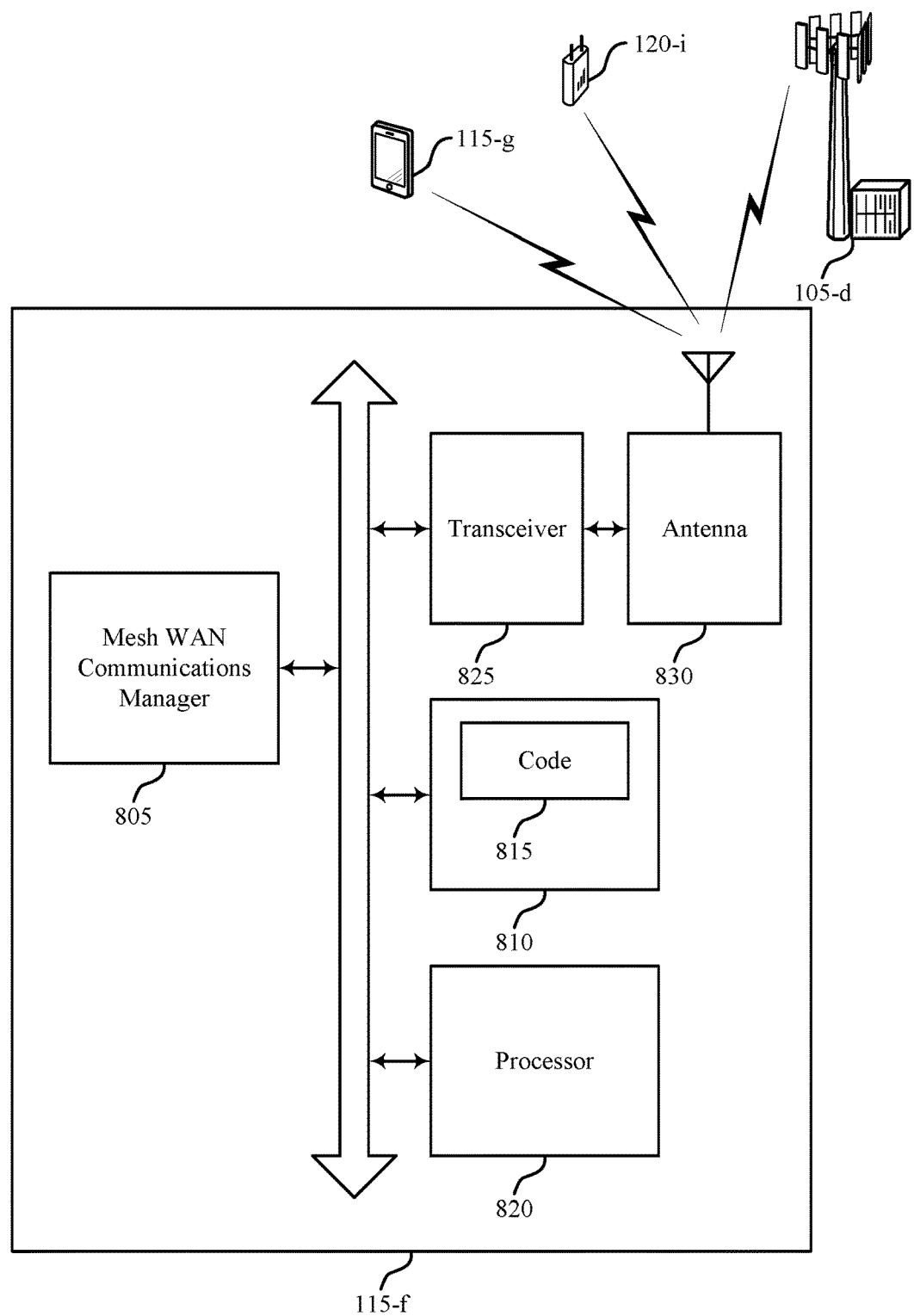
FIG. 8 shows a diagram of a wireless communication system including a device that supports mechanisms for co-existence between communication modes in a mesh WAN, in accordance with one or more aspects of the present disclosure.

FIG. 8 shows a diagram of a wireless communication system 800 including a device that supports mechanisms for co-existence between communication modes in a mesh WAN, in accordance with one or more aspects of the present disclosure. For example, wireless communication system 800 may include UE 115-*f*, which may be an example of one or more aspects of a wireless device 500, a wireless device 600, a UE 115 (or, in another example, a relay 120) as described with reference to FIGS. 1 through 7. UE 115-*f* may include mesh WAN communications manager 805, memory 810, processor 820, transceiver 825, and antenna 830. Each of these modules may communicate, directly or indirectly, with one another (e.g., via one or more buses). The mesh WAN communications manager 805 may be an example of one or more aspects of a mesh WAN communications manager as described with reference to FIGS. 5 through 7, and/or may be or include a UE/Relay mesh WAN co-existence manager 135 as described with reference to FIG. 1.

The memory 810 may include random access memory (RAM) and/or read only memory (ROM). The memory 810 may store computer-readable, computer-executable software/firmware code 815 including instructions that, when executed by the processor 820, cause the UE 115-*f* to perform various functions described in the present disclosure (e.g., mechanisms for co-existence between communication modes in a mesh WAN, etc.). In some examples, the code 815 may not be directly executable by the processor but may cause a computer (e.g., when compiled and executed) to perform functions described in the present disclosure. The processor 820 may include an intelligent hardware device, (e.g., a central processing unit (CPU), a microcontroller, an application-specific integrated circuit (ASIC), etc.).

The transceiver 825 may communicate bi-directionally, via one or more antennas, wired, or wireless links, with one or more networks, as described in the present disclosure. For example, the transceiver 825 may communicate bi-directionally with a base station 105-*d*, a UE 115-*g*, or a relay 120-*i*. The transceiver 825 may also include a modem to modulate the packets and provide the modulated packets to the antennas for transmission, and to demodulate packets received from the antennas. In some examples, the wireless device may include a single antenna 830. However, in some examples the device may have more than one antenna 830, which may be capable of concurrently transmitting or receiving multiple wireless transmissions.

Figure 9:
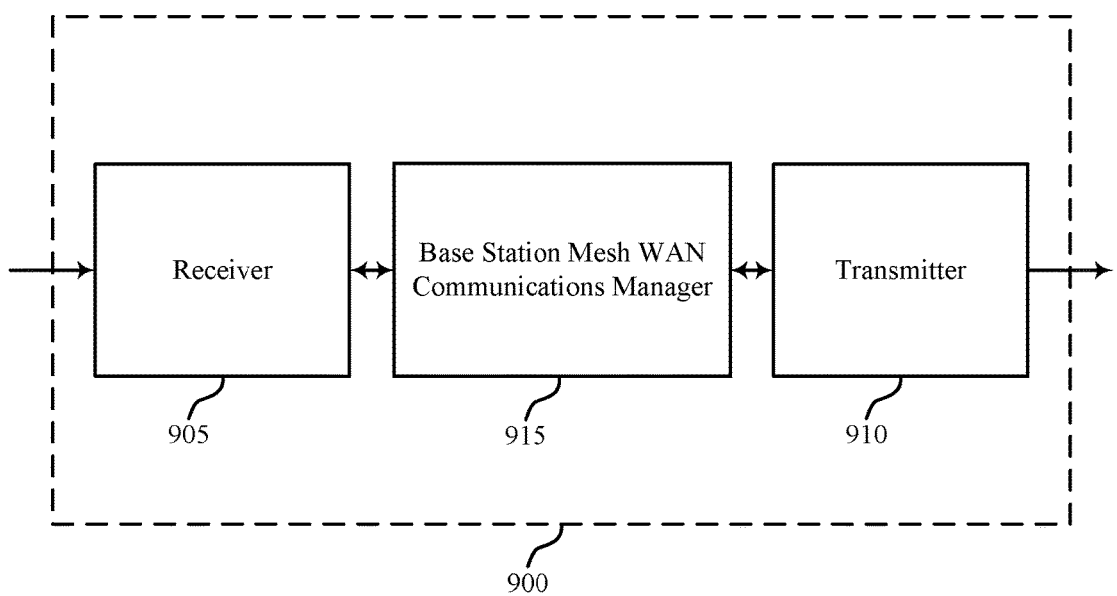
FIGS. 9 and 10 show block diagrams of wireless devices that support mechanisms for co-existence between communication modes in a mesh WAN, in accordance with one or more aspects of the present disclosure.

FIG. 9 shows a block diagram of a wireless device 900 that supports mechanisms for co-existence between communication modes in a mesh WAN, in accordance with one or more aspects of the present disclosure. Wireless device 900 may be an example of one or more aspects of a base station 105 as described with reference to FIGS. 1 through 4B and 8. Wireless device 900 may include a receiver 905, a transmitter 910, and a base station mesh WAN communications manager 915. In some examples, base station mesh WAN communications manager 915 may be or include a base station mesh WAN co-existence manager 140 as described with reference to FIG. 1. Wireless device 900 may also include a processor. Each of these components may be in communication with each other.

The receiver 905 may receive information such as packets, user data, or control information associated with various information channels (e.g., control channels, data channels, and information related to co-existence between communication modes in a mesh WAN, etc.). Information may be passed on to other components of the device. The receiver 905 may be an example of one or more aspects of the transceiver 1225 described with reference to FIG. 12. The receiver 905 may include a single antenna, or it may include a plurality of antennas.

The transmitter 910 may transmit signals received from other components of wireless device 900. In some examples, the transmitter 910 may be collocated with a receiver in a transceiver module. For example, the transmitter 910 may be an example of one or more aspects of the transceiver 1225 described with reference to FIG. 12. The transmitter 910 may include a single antenna, or it may include a plurality of antennas.

The base station mesh WAN communications manager 915 may allocate a first set of communication resources for direct communications and a second set of communication resources for D2D communications to schedule communications over a wireless network, where wireless devices in the wireless network may perform D2D communications using one of a first mode or a second mode; assign the second set of communication resources to wireless devices using the first mode; and transmit (e.g., in cooperation with the transmitter 910) an indication that the second set of communication resources is reserved for the wireless devices using the first mode. The base station mesh WAN communications manager 915 may also be an example of one or more aspects of the base station mesh WAN communications manager 1205 described with reference to FIG. 12.

Figure 10:
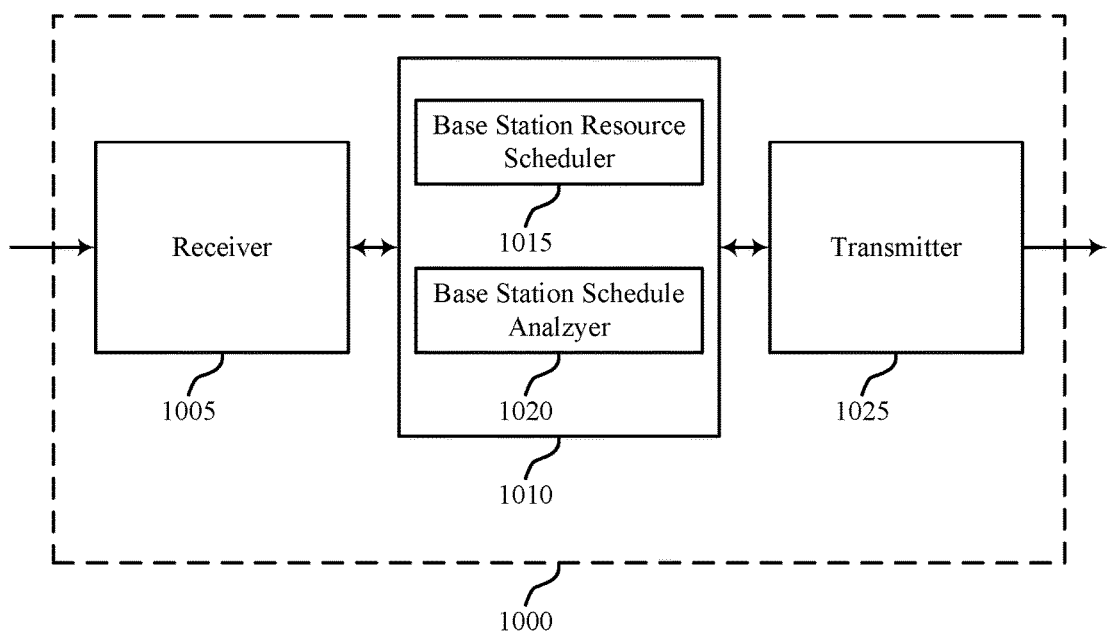

FIG. 10 shows a block diagram of a wireless device 1000 that supports mechanisms for co-existence between communication modes in a mesh WAN, in accordance with one or more aspects of the present disclosure. Wireless device 1000 may be an example of one or more aspects of a wireless device 900 or a base station 105 described with reference to FIGS. 1 through 4B and 9. Wireless device 1000 may include a receiver 1005, a base station mesh WAN communications manager 1010, and a transmitter 1025. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of one or more aspects of the transceiver 1225 described with reference to FIG. 12.

The base station mesh WAN communications manager 1010 may be an example of one or more aspects of base station mesh WAN communications manager 915 described with reference to FIG. 9. The base station mesh WAN communications manager 1010 may include a base station resource scheduler 1015 and a base station schedule analyzer 1020. The base station mesh WAN communications manager 1010 may be an example of one or more aspects of the base station mesh WAN communications manager 1205 described with reference to FIG. 12.

The base station resource scheduler 1015 may allocate a first set of communication resources for direct communications and a second set of communication resources for D2D communications to schedule communications over a wireless network, where wireless devices in the wireless network perform D2D communications using one of a first mode or a second mode. In various examples the first mode or the second mode may be, or be otherwise associated with a scheduled communication scheme or a contention-based communication scheme.

The base station schedule analyzer 1020 may assign the second set of communication resources to wireless devices using the first mode.

The transmitter 1025 may transmit signals received from other components of wireless device 1000. In some examples, the transmitter 1025 may be collocated with a receiver in a transceiver module. For example, the transmitter 1025 may be an example of one or more aspects of the transceiver 1225 described with reference to FIG. 12. The transmitter 1025 may utilize a single antenna, or it may utilize a plurality of antennas. In some examples, the transmitter 1025 may transmit an indication that the second set of communication resources is reserved for the wireless devices using the first mode. In some examples, the transmitter 1025 may transmit a configuration message configuring a wireless device to perform the D2D communications using the first mode. In some examples, the transmitter 1025 may also transmit the schedule to the wireless devices in the wireless network.

Figure 11:
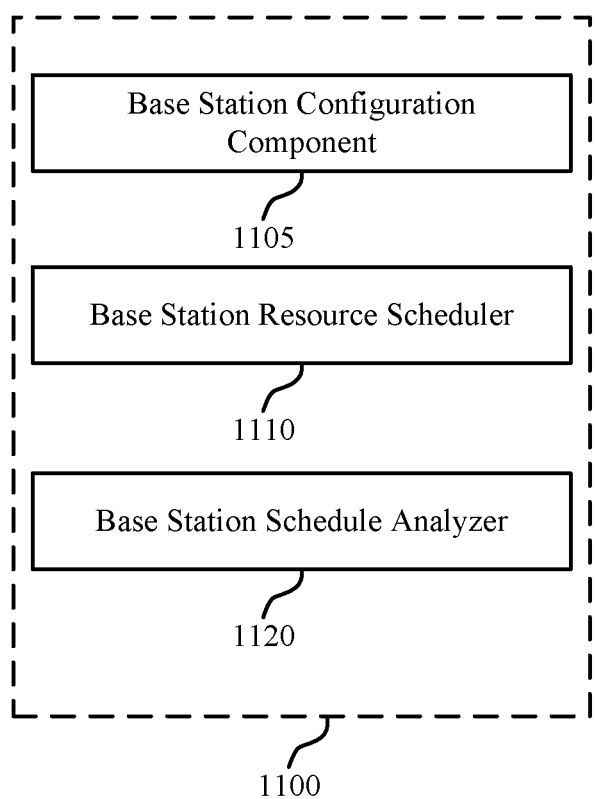
FIG. 11 shows a block diagram of a base station mesh WAN communications manager that supports mechanisms for co-existence between communication modes in a mesh WAN, in accordance with one or more aspects of the present disclosure.

FIG. 11 shows a block diagram of a base station mesh WAN communications manager 1100 that supports mechanisms for co-existence between communication modes in a mesh WAN, in accordance with one or more aspects of the present disclosure. The base station mesh WAN communications manager 1100 may be an example of one or more aspects of the corresponding component of wireless device 900 or wireless device 1000. That is, base station mesh WAN communications manager 1100 may be an example of one or more aspects of base station mesh WAN communications manager 915 or base station mesh WAN communications manager 1010 described with reference to FIGS. 9 and 10. The base station mesh WAN communications manager 1100 may also be an example of one or more aspects of the base station mesh WAN communications manager 1205 described with reference to FIG. 12.

The base station mesh WAN communications manager 1100 may include a base station configuration component 1105, a base station resource scheduler 1110, and a base station schedule analyzer 1120. Each of these modules may communicate, directly or indirectly, with one another (e.g., via one or more buses).

The base station configuration component 1105 may determine a communication mode to be used by a wireless device, such as a relay 120 or UE 115 as described with reference to FIGS. 1 through 9.

The base station resource scheduler 1110 may allocate a first set of communication resources for direct communications and a second set of communication resources for D2D communications to schedule communications over a wireless network, where wireless devices in the wireless network perform D2D communications using one of a first mode or a second mode, and assign the second set of communication resources to wireless devices using the first mode. The base station resource scheduler 1110 may be an example of one or more aspects of the base station resource scheduler 1015 as described with reference to FIG. 10.

The base station schedule analyzer 1120 may transmit (e.g., in cooperation with a transmitter) an indication that the second set of communication resources is reserved for the wireless devices using the first mode. The base station schedule analyzer 1120 may be an example of one or more aspects of the base station schedule analyzer 1020 as described with reference to FIG. 10.

Figure 12:
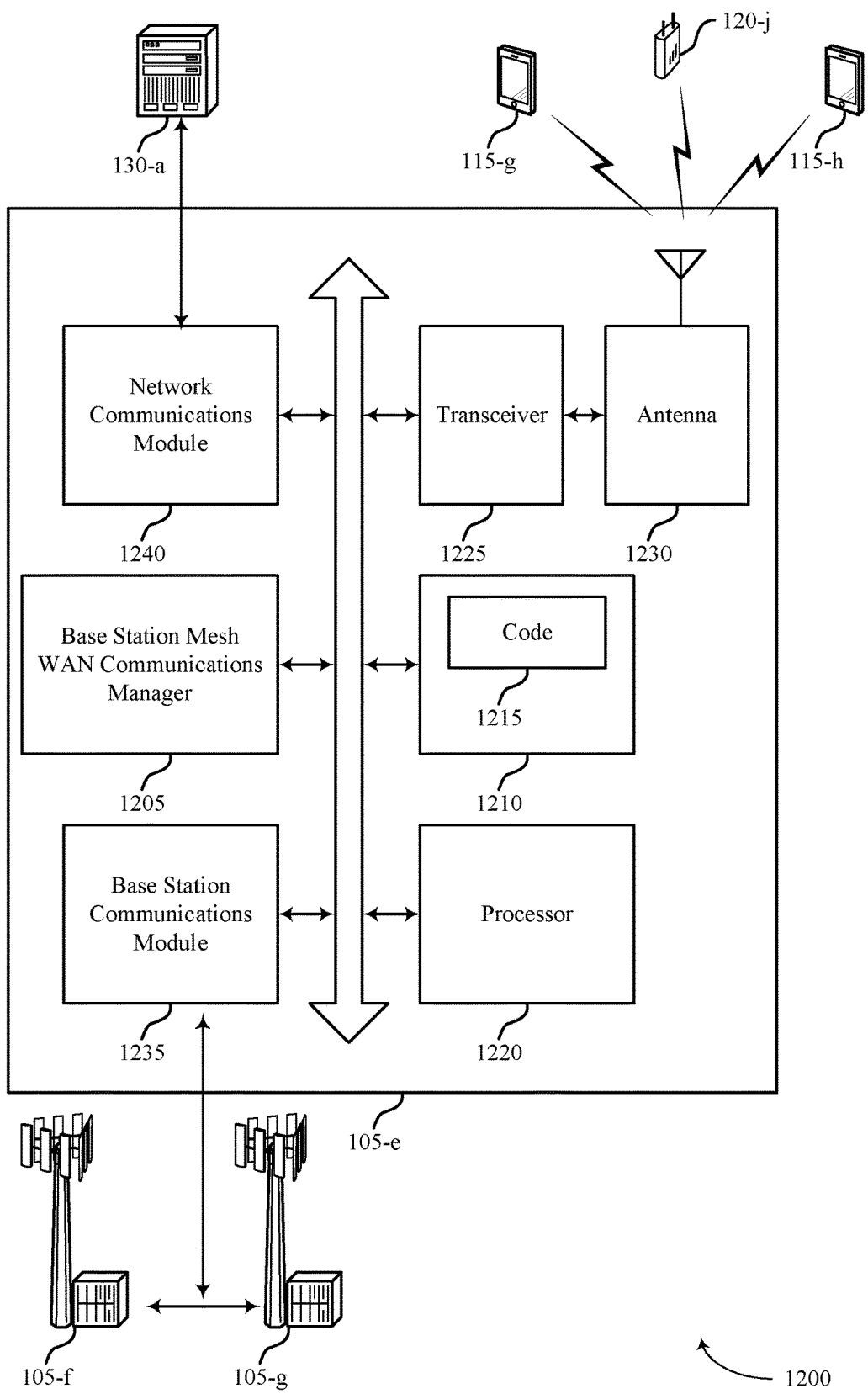
FIG. 12 shows a diagram of a wireless communication system including a device that supports mechanisms for co-existence between communication modes in a mesh WAN, in accordance with one or more aspects of the present disclosure.

FIG. 12 shows a diagram of a wireless communication system 1200 including a device that supports mechanisms for co-existence between communication modes in a mesh WAN, in accordance with one or more aspects of the present disclosure. For example, wireless communication system 1200 may include base station 105-e, which may be an example of one or more aspects of a wireless device 900, a wireless device 1000, or a base station 105 as described with reference to FIGS. 1 through 4B and 9 through 11. Base station 105-e may also include components for bi-directional voice and data communications including components for transmitting communications and components for receiving communications. For example, base station 105-e may communicate bi-directionally with one or more UEs 115 or relays 120. Base station 105-e may include base station mesh WAN communications manager 1205, memory 1210, processor 1220, transceiver 1225, antenna 1230, base station communications module 1235 and network communications module 1240. Each of these modules may communicate, directly or indirectly, with one another (e.g., via one or more buses). The base station mesh WAN communications manager 1205 may be an example of one or more aspects of a base station mesh WAN communications manager as described with reference to FIGS. 9 through 11, which may be or include a base station mesh WAN co-existence manager 140 as described with reference to FIG. 1.

The memory 1210 may include RAM and/or ROM. The memory 1210 may store computer-readable, computer-executable software/firmware code 1215 including instructions that, when executed by the processor 1220, cause the base station 105-e to perform various functions described in the present disclosure (e.g., mechanisms for co-existence between communication modes in a mesh wide area network, etc.). In some examples, the code 1215 may not be directly executable by the processor but may cause a computer (e.g., when compiled and executed) to perform functions described in the present disclosure. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described in the present disclosure. For example, the transceiver 1225 may communicate bi-directionally with a base station 105, a UE 115, or a relay 120. The transceiver 1225 may also include a modem to modulate the packets and provide the modulated packets to the antennas for transmission, and to demodulate packets received from the antennas. In some examples, the wireless device may include a single antenna 1230. However, in some examples the device may have more than one antenna 1230, which may be capable of concurrently transmitting or receiving multiple wireless transmissions.

The base station communications module 1235 may manage communications with other base station 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module 1235 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115 or relays 120.

Figure 13:
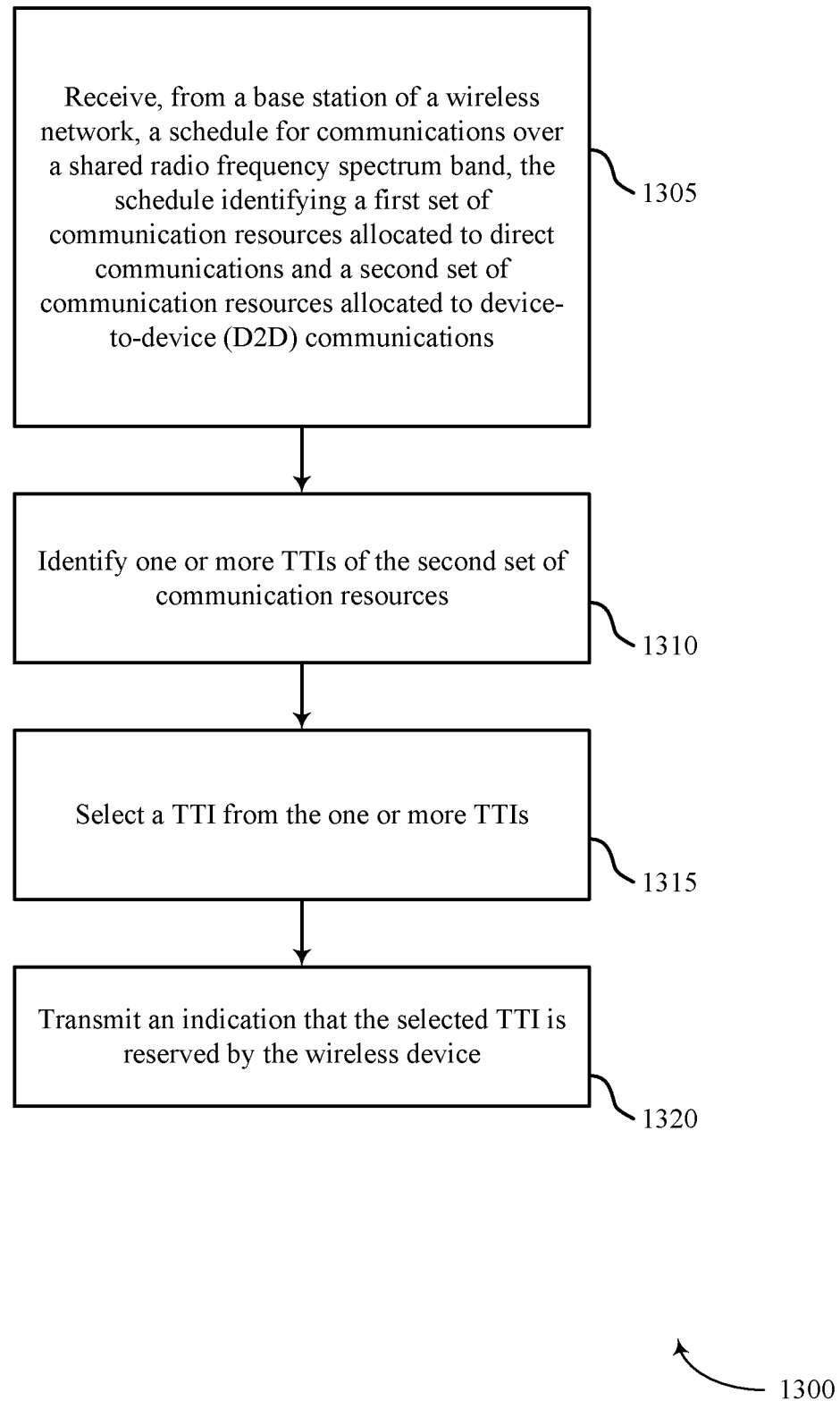
FIGS. 13 through 16 illustrate methods that support mechanisms for co-existence between communication modes in a mesh WAN, in accordance with one or more aspects of the present disclosure.

FIG. 13 illustrates a method 1300 that supports mechanisms for co-existence between communication modes in a mesh WAN, in accordance with one or more aspects of the present disclosure. The operations of method 1300 may be implemented by a device such as a UE 115 or relay 120 or its components as described with reference to FIGS. 1 through 4B. For example, the operations of method 1300 may be performed by a mesh WAN communications manager or a UE/Relay mesh WAN coexistence manager as described in the present disclosure. In some examples, the UE 115 or relay 120 may execute a set of codes to control the functional elements of the device to perform the functions described below. Additionally or alternatively, the UE 115 or relay 120 may perform aspects the functions described below using special-purpose hardware.

At block 1305, the UE 115 or relay 120 may receive, from a base station of a wireless network, a schedule for communications over a shared radio frequency spectrum band, the schedule identifying a first set of communication resources allocated to direct communications and a second set of communication resources allocated to D2D communications as described with reference to FIGS. 1 through 4A. In some examples the wireless devices in the wireless network may perform the D2D communications using one of a first mode or a second mode. Operations of block 1305 may be performed by a resource schedule manager as described with reference to FIGS. 6 and 7.

At block 1310, the UE 115 or relay 120 may identify one or more TTIs of the second set of communication resources as described with reference to FIGS. 1 through 4A. Operations of block 1310 may be performed by a discovery component as described with reference to FIGS. 6 and 7.

At block 1315, the UE 115 or relay 120 may select a TTI from the one or more TTIs as described with reference to FIGS. 1 through 4A. Operations of block 1315 may be performed by a resource selector as described with reference to FIGS. 6 and 7.

At block 1320, the UE 115 or relay 120 may transmit an indication that the selected TTI is reserved by the wireless device as described with reference to FIGS. 1 through 4A. Operations of block 1320 may be performed by a schedule analyzer as described with reference to FIGS. 6 and 7.

Figure 14:
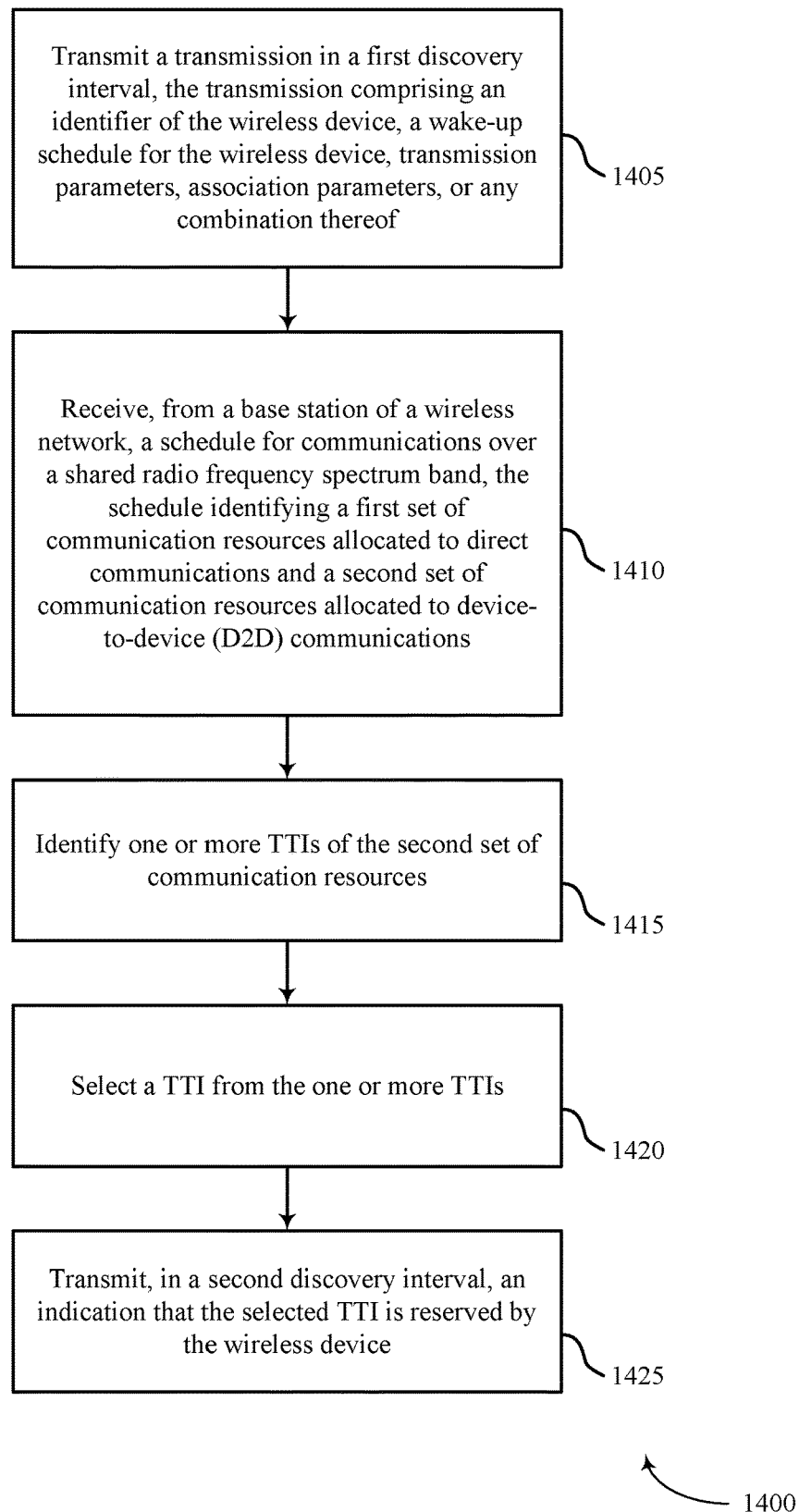

FIG. 14 illustrates a method 1400 that supports mechanisms for co-existence between communication modes in a mesh WAN, in accordance with one or more aspects of the present disclosure. The operations of method 1400 may be implemented by a device such as a UE 115 or relay 120 or its components as described with reference to FIGS. 1 through 4B. For example, the operations of method 1400 may be performed by a mesh WAN communications manager or a UE/Relay mesh WAN coexistence manager as described in the present disclosure. In some examples, the UE 115 or relay 120 may execute a set of codes to control the functional elements of the device to perform the functions described below. Additionally or alternatively, the UE 115 or relay 120 may perform aspects the functions described below using special-purpose hardware.

At block 1405, the UE 115 or relay 120 may transmit a transmission in a first discovery interval, the transmission comprising an identifier of the wireless device, a wake-up schedule for the wireless device, transmission parameters, association parameters, or any combination thereof as described with reference to FIGS. 1 through 4A. Operations of block 1425 may be performed by a transmitter as described with reference to FIGS. 6 and 7.

At block 1410, the UE 115 or relay 120 may receive, from a base station of a wireless network, a schedule for communications over a shared radio frequency spectrum band, the schedule identifying a first set of communication resources allocated to direct communications and a second set of communication resources allocated to D2D communications as described with reference to FIGS. 1 through 4A. In some examples the wireless devices in the wireless network may perform the D2D communications using one of a first mode or a second mode. Operations of block 1405 may be performed by a resource schedule manager as described with reference to FIGS. 6 and 7.

At block 1415, the UE 115 or relay 120 may identify one or more TTIs of the second set of communication resources as described with reference to FIGS. 1 through 4A. Operations of block 1410 may be performed by a discovery component as described with reference to FIGS. 6 and 7.

At block 1420, the UE 115 or relay 120 may select a TTI from the one or more TTIs as described with reference to FIGS. 1 through 4A. Operations of block 1415 may be performed by a resource selector as described with reference to FIGS. 6 and 7.

At block 1425, the UE 115 or relay 120 may transmit, in a second discovery interval, an indication that the selected TTI is reserved by the wireless device as described with reference to FIGS. 1 through 4A. Operations of block 1420 may be performed by a schedule analyzer as described with reference to FIGS. 6 and 7.

Figure 15:
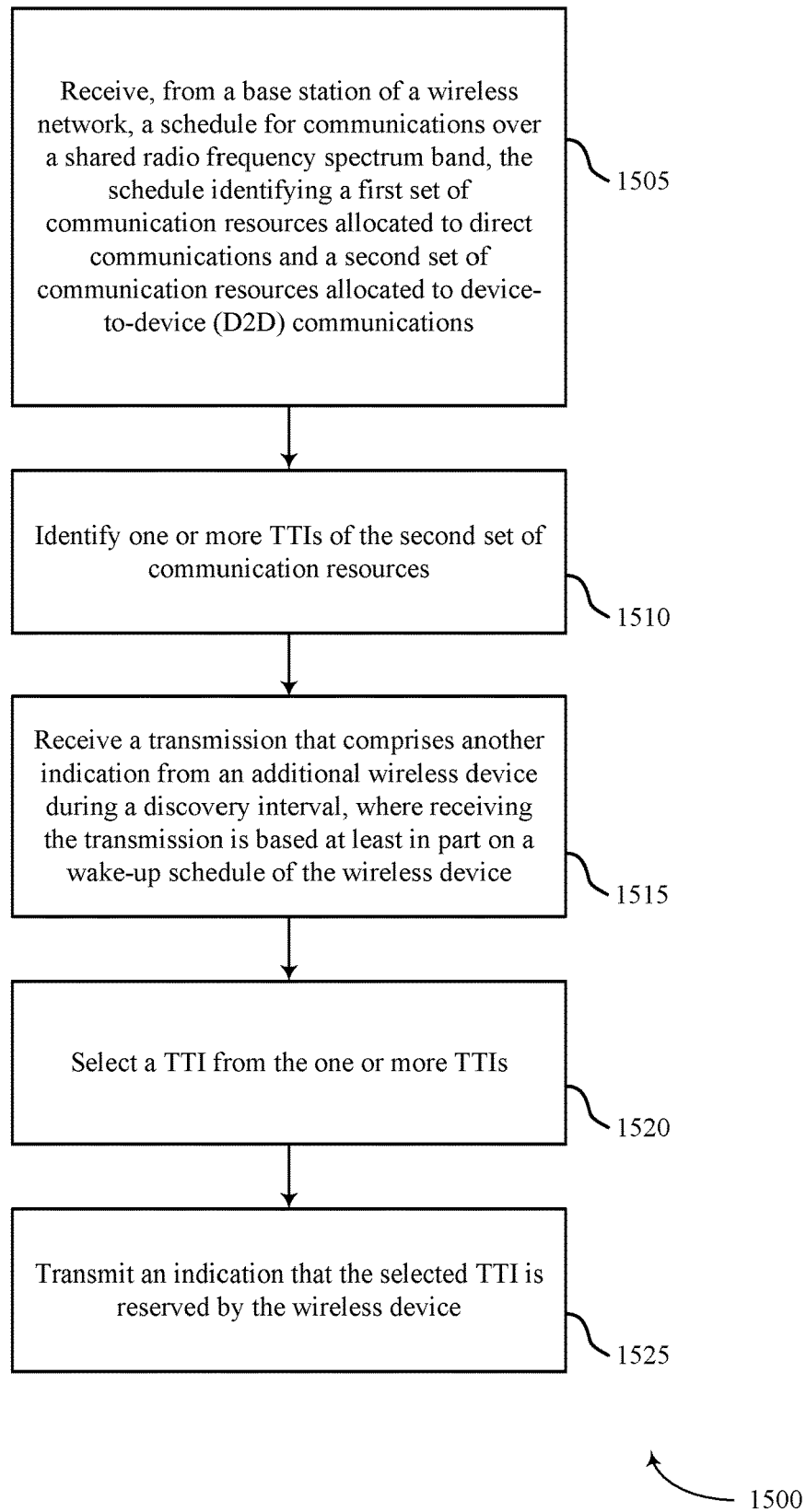

FIG. 15 illustrates a method 1500 that supports mechanisms for co-existence between communication modes in a mesh WAN, in accordance with one or more aspects of the present disclosure. The operations of method 1500 may be implemented by a device such as a UE 115 or relay 120 or its components as described with reference to FIGS. 1 through 4B. For example, the operations of method 1500 may be performed by a mesh WAN communications manager or a UE/Relay mesh WAN coexistence manager as described in the present disclosure. In some examples, the UE 115 or relay 120 may execute a set of codes to control the functional elements of the device to perform the functions described below. Additionally or alternatively, the UE 115 or relay 120 may perform aspects the functions described below using special-purpose hardware.

At block 1505, the UE 115 or relay 120 may receive, from a base station of a wireless network, a schedule for communications over a shared radio frequency spectrum band, the schedule identifying a first set of communication resources allocated to direct communications and a second set of communication resources allocated to D2D communications as described with reference to FIGS. 1 through 4A. In some examples wireless devices in the wireless network may perform the D2D communications using one of a first mode or a second mode. Operations of block 1505 may be performed by a resource schedule manager as described with reference to FIGS. 6 and 7.

At block 1510, the UE 115 or relay 120 may identify one or more TTIs of the second set of communication resources as described with reference to FIGS. 1 through 4A. Operations of block 1510 may be performed by a discovery component as described with reference to FIGS. 6 and 7.

At block 1515, the UE 115 or relay 120 may receive a transmission that comprises another indication from an additional wireless device during a discovery interval, where receiving the transmission is based at least in part on a wake-up schedule of the wireless device as described with reference to FIGS. 1 through 4A. Operations of block 1525 may be performed by a resource schedule manager as described with reference to FIGS. 6 and 7.

At block 1520, the UE 115 or relay 120 may select a TTI from the one or more TTIs as described with reference to FIGS. 1 through 4A. Operations of block 1515 may be performed by a resource selector as described with reference to FIGS. 6 and 7.

At block 1525, the UE 115 or relay 120 may transmit an indication that the selected TTI is reserved by the wireless device as described with reference to FIGS. 1 through 4A. Operations of block 1520 may be performed by a schedule analyzer as described with reference to FIGS. 6 and 7.

Figure 16:
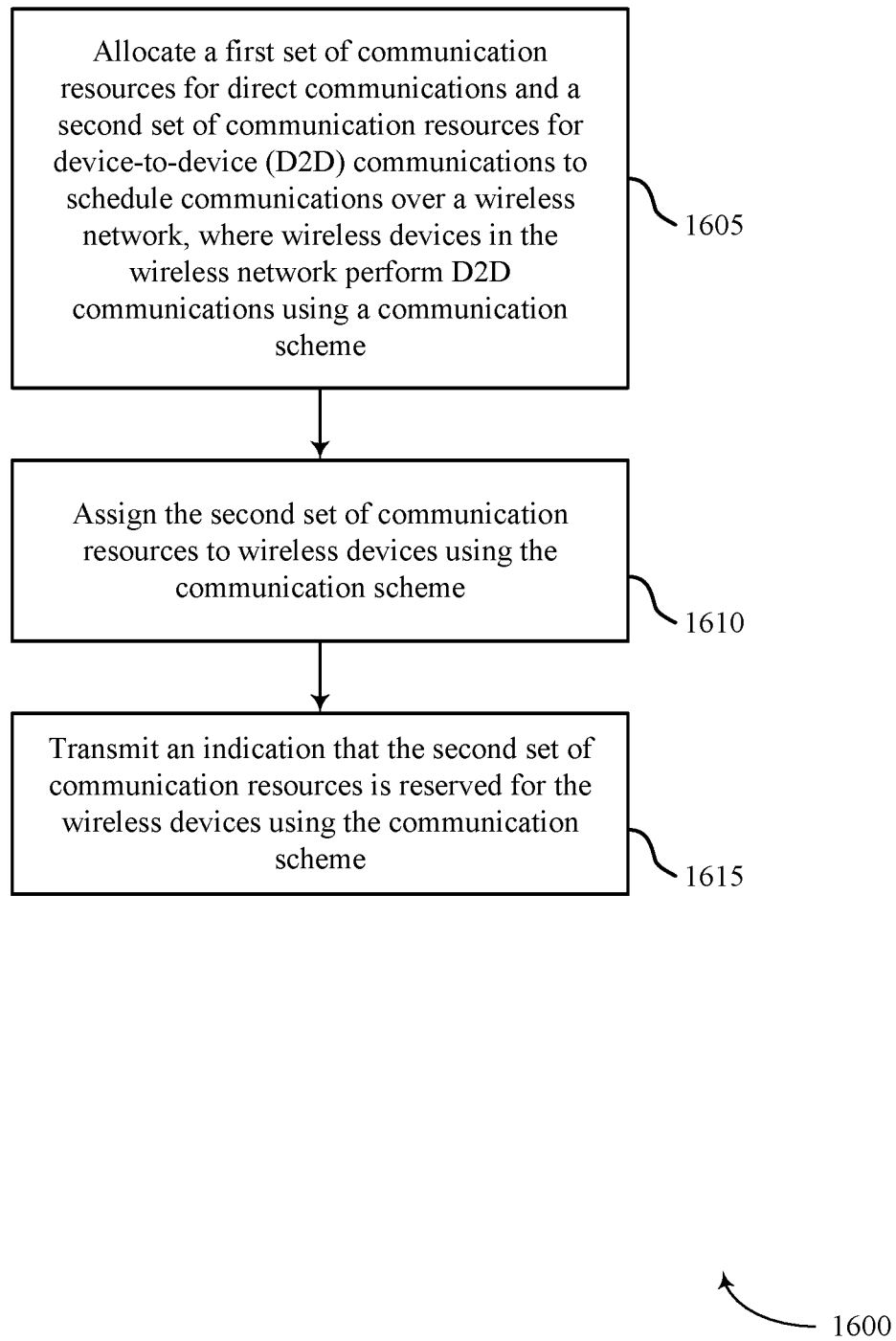

FIG. 16 illustrates a method 1600 that supports mechanisms for co-existence between communication modes in a mesh WAN, in accordance with one or more aspects of the present disclosure. The operations of method 1600 may be implemented by a device such as a base station 105 or its components as described with reference to FIGS. 1 through 4B. For example, the operations of method 1600 may be performed by a base station mesh WAN communications manager or a base station mesh WAN coexistence manager as described in the present disclosure. In some examples, the base station 105 may execute a set of codes to control the functional elements of the device to perform the functions described below. Additionally or alternatively, the base station 105 may perform aspects the functions described below using special-purpose hardware.

At block 1605, the base station 105 may allocate a first set of communication resources for direct communications and a second set of communication resources for D2D communications to schedule communications over a wireless network as described with reference to FIGS. 1 through 3B and 4B. In some examples wireless devices in the wireless network may perform D2D communications using a communication scheme as described with reference to FIGS. 1 through 3B and 4B (e.g., wireless devices may be configured to perform D2D communications according to a scheduled communication scheme, or a contention-based communication scheme, or a combination thereof.). In some examples, the communication scheme may be, or may be otherwise associated with a scheduled communication scheme or a contention-based communication scheme. Operations of block 1605 may be performed by a base station resource scheduler as described with reference to FIGS. 10 and 11.

At block 1610, the base station 105 may assign the second set of communication resources to wireless devices using the communication scheme (e.g., assign the second set of communication resources to wireless devices using a scheduled communication scheme or assign the second set of communication resources to wireless devices using a contention-based communication scheme) as described with reference to FIGS. 1 through 3B and 4B. Operations of block 1610 may be performed by a base station schedule analyzer as described with reference to FIGS. 10 and 11.

At block 1615, the base station 105 may transmit an indication that the second set of communication resources is reserved for the wireless devices using the communication scheme as described with reference to FIGS. 1 through 3B and 4B. Operations of block 1615 may be performed by a base station schedule analyzer as described with reference to FIGS. 10 and 11.

It should be noted that these methods describe possible implementation, and that the operations may be rearranged or otherwise modified such that other implementations are possible. In some examples, aspects from two or more of the methods may be combined. For example, aspects of each of the methods may include operations of the other methods, or other operations or techniques described herein. Thus, aspects of the disclosure may provide mechanisms for co-existence between communication modes in a mesh WAN.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), Institute of Electrical and Electronics Engineers (IEEE) 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-A are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description herein, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some examples, different coverage areas may be associated with different communication technologies. In some examples, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, those of the wireless communications system 100 or wireless communications subsystem 300 of FIGS. 1 and 3 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency-division duplex (FDD) (e.g., using paired spectrum resources) or time-division duplex (TDD) operation (e.g., using unpaired spectrum resources). Frame structures may be defined for FDD (e.g., frame structure type 1) and TDD (e.g., frame structure type 2).

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a wireless device comprising:
   receiving, at the wireless device from a central node of a wireless network, a schedule of resources for communications over a shared radio frequency spectrum band, the schedule of resources identifying a first set of communication resources allocated by the central node for direct communications between the central node and other wireless devices of the wireless network and a second set of communication resources allocated by the central node for device-to-device (D2D) communications, between wireless devices of the wireless network other than the central node, that are performed using a relay-scheduled communication scheme or a contention-based protocol between wireless devices of the wireless network other than the central node;
   identifying, at the wireless device, one or more transmission time intervals of the second set of communication resources allocated by the central node for D2D communications;
   selecting, at the wireless device, a transmission time interval from the one or more transmission time intervals of the second set of communication resources allocated by the central node for D2D communications; and
   transmitting, at the wireless device, an indication that the selected transmission time interval is reserved by the wireless device.

2. The method of claim 1, wherein the indication comprises a transmission time interval index, periodicity information, offset information, or a combination thereof.

3. The method of claim 1, further comprising:
   transmitting a transmission in a first discovery interval, the transmission comprising an identifier of the wireless device, a wake-up schedule for the wireless device, transmission parameters, association parameters, a communication mode of the wireless device, or a combination thereof, wherein the indication is transmitted in a second discovery interval.

4. The method of claim 3, wherein the transmission is transmitted in the first discovery interval based at least in part on a wake-up schedule, the wake-up schedule being used to schedule a common wake-up period for the wireless devices in the wireless network.

5. The method of claim 3, further comprising:
   identifying a communication resource within the first discovery interval for transmitting the transmission; and
   using a location of the communication resource in the second discovery interval for transmitting the indication.

6. The method of claim 1, wherein the indication is transmitted in a discovery interval, the indication comprising an identifier of the wireless device, a wake-up schedule for the wireless device, transmission parameters, association parameters, or a combination thereof.

7. The method of claim 1, wherein the selecting comprises:
   identifying that the transmission time interval is not reserved by another wireless device.

8. The method of claim 1, further comprising:
   receiving a transmission that comprises another indication from another wireless device during a discovery interval, wherein receiving the transmission is based at least in part on a wake-up schedule of the wireless device.

9. The method of claim 1, further comprising:
   receiving a transmission from another wireless device, wherein the transmission comprises another indication that a different transmission time interval is reserved by the other wireless device; and
   selecting the transmission time interval based at least in part on the other indication.

10. The method of claim 1, further comprising:
    receiving a transmission from another wireless device, wherein the transmission comprises another indication that the transmission time interval is reserved by the other wireless device;
    measuring a received signal strength of the transmission; and selecting the transmission time interval based at least in part on the measured signal strength of the transmission.

11. The method of claim 1, further comprising:
receiving, from the central node, a configuration message configuring the wireless device to perform the D2D communications using one of the relay-scheduled communication scheme or the contention-based protocol between wireless devices of the wireless network other than the central node.

12. The method of claim 11, wherein:
the schedule of resources for communications over the shared radio frequency spectrum band indicates that at least a portion of the second set of communication resources is reserved for wireless devices using one of the relay-scheduled communication scheme or the contention-based protocol; and
selecting a transmission time interval from the one or more transmission time intervals of the second set of communication resources is based at least in part on the indication.

13. A method of wireless communication at a central node of a wireless network, the method comprising:
allocating, by the central node, a first set of communication resources for direct communications between the central node and other wireless devices of the wireless network and a second set of communication resources for device-to-device (D2D) communications, between wireless devices of the wireless network other than the central node;
assigning the second set of communication resources for D2D communications using one of a relay-scheduled communication scheme or a contention-based protocol between wireless devices of the wireless network other than the central node; and
transmitting an indication that the second set of communication resources is reserved for D2D communications performed by wireless devices using the one of the relay-scheduled communication scheme or the contention-based protocol between wireless devices of the wireless network other than the central node.

14. The method of claim 13, further comprising:
transmitting the allocation to the wireless devices in the wireless network.

15. The method of claim 13, further comprising:
transmitting a configuration message configuring a wireless device to perform the D2D communications using the one of the relay-scheduled communication scheme or the contention-based protocol between wireless devices of the wireless network other than the central node.

16. An apparatus for wireless communication at a wireless device, the apparatus comprising:
a processor;
memory in electronic communication with the processor; and
the processor and memory configured to:
receive, from a central node of a wireless network, a schedule of resources for communications over a shared radio frequency spectrum band, the schedule of resources identifying a first set of communication resources allocated by the central node for direct communications between the central node and other wireless devices of the wireless network and a second set of communication resources allocated by the central node for device-to-device (D2D) communications, between wireless devices of the wireless network other than the central node, that are performed using a relay-scheduled communication scheme or a contention-based protocol between wireless devices of the wireless network other than the central node;
identify one or more transmission time intervals of the second set of communication resources allocated by the central node for D2D communications;
select a transmission time interval from the one or more transmission time intervals of the second set of communication resources allocated by the central node for D2D communications; and
transmit an indication that the selected transmission time interval is reserved by the wireless device.

17. The apparatus of claim 16, wherein the indication comprises a transmission time interval index, periodicity information, offset information, or a combination thereof.

18. The apparatus of claim 16, wherein the processor and memory are configured to:
transmit a transmission in a first discovery interval, the transmission comprising an identifier of the wireless device, a wake-up schedule for the wireless device, transmission parameters, association parameters, or a combination thereof, wherein the indication is transmitted in a second discovery interval.

19. The apparatus of claim 18, wherein the transmission is transmitted in the first discovery interval based at least in part on a wake-up schedule, the wake-up schedule being used to schedule a common wake-up period for the wireless devices in the wireless network.

20. The apparatus of claim 18, wherein the processor and memory are configured to:
identify a communication resource within the first discovery interval for transmitting the transmission; and
use a location of the communication resource in the second discovery interval for transmitting the indication.

21. The apparatus of claim 16, wherein the indication is transmitted in a discovery interval, the indication comprising an identifier of the wireless device, a wake-up schedule for the wireless device, transmission parameters, association parameters, or a combination thereof.

22. The apparatus of claim 16, wherein the processor and memory are configured to select the transmission time interval are further configured to:
identify that the transmission time interval is not reserved by another wireless device.

23. The apparatus of claim 16, wherein the processor and memory are configured to:
receive a transmission that comprises another indication from another wireless device during a discovery interval, wherein receiving the transmission is based at least in part on a wake-up schedule of the wireless device.

24. The apparatus of claim 16, wherein the processor and memory are configured to:
receive a transmission from another wireless device, wherein the transmission comprises another indication that a different transmission time interval is reserved by the other wireless device; and
select the transmission time interval based at least in part on the other indication.

25. The apparatus of claim 16, wherein the processor and memory are configured to:
receive a transmission from another wireless device, wherein the transmission comprises another indication that the transmission time interval is reserved by the other wireless device;

measure a received signal strength of the transmission; and select the transmission time interval based at least in part on the measured signal strength of the transmission.

26. The apparatus of claim 16, wherein the processor and memory are configured to:

receive, from the central node, a configuration message configuring the wireless device to perform the D2D communications using one of the relay-scheduled communication scheme or the contention-based protocol between wireless devices of the wireless network other than the central node.

27. The apparatus of claim 26, wherein:

the schedule of resources for communications over the shared radio frequency spectrum band indicates that at least a portion of the second set of communication resources is reserved for wireless devices using one of the relay-scheduled communication scheme or the contention-based protocol; and the processor and memory are configured to select the transmission time interval from the one or more transmission time intervals of the second set of communication resources based at least in part on the indication.

28. An apparatus for wireless communication at a central node of a wireless network, the apparatus comprising:

a processor;

memory in electronic communication with the processor; and the processor and memory configured to:

allocate a first set of communication resources for direct communications between the central node and other wireless devices of the wireless network and a second set of communication resources for device-to-device (D2D) communications, between wireless devices of the wireless network other than the central node;

assign the second set of communication resources for D2D communications using one of a relay-scheduled communication scheme or a contention-based protocol between wireless devices of the wireless network other than the central node; and transmit an indication that the second set of communication resources is reserved for D2D communications performed by wireless devices using the one of the relay-scheduled communication scheme or the contention-based protocol between wireless devices of the wireless network other than the central node.

29. The apparatus of claim 28, wherein the processor and memory are configured to:

transmit the allocation to the wireless devices in the wireless network.

30. The apparatus of claim 28, wherein the processor and memory are configured to:

transmit a configuration message configuring a wireless device to perform the D2D communications using the one of the relay-scheduled communication scheme or the contention-based protocol between wireless devices of the wireless network other than the central node.

* * * * *